US008892424B2

(12) United States Patent
Harada et al.

(10) Patent No.: US 8,892,424 B2
(45) Date of Patent: Nov. 18, 2014

(54) AUDIO ANALYSIS TERMINAL AND SYSTEM FOR EMOTION ESTIMATION OF A CONVERSATION THAT DISCRIMINATES UTTERANCE OF A USER AND ANOTHER PERSON

(75) Inventors: Haruo Harada, Kanagawa (JP); Hirohito Yoneyama, Kanagawa (JP); Kei Shimotani, Kanagawa (JP); Yohei Nishino, Kanagawa (JP); Kiyoshi Iida, Kanagawa (JP); Takao Naito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 370 days.

(21) Appl. No.: 13/371,135

(22) Filed: Feb. 10, 2012

(65) Prior Publication Data
US 2013/0080169 A1 Mar. 28, 2013

(30) Foreign Application Priority Data
Sep. 27, 2011 (JP) ................................. 2011-211480

(51) Int. Cl.
G10L 11/00 (2006.01)
G10L 15/02 (2006.01)
G10L 25/63 (2013.01)
H04R 3/00 (2006.01)
H04R 5/027 (2006.01)
G10L 17/00 (2013.01)

(52) U.S. Cl.
CPC ................ *H04R 3/005* (2013.01); *H04R 5/027* (2013.01); *H04R 2420/07* (2013.01); *G10L 25/63* (2013.01); *G10L 17/00* (2013.01)
USPC ......................... 704/201; 704/236; 704/270.1

(58) Field of Classification Search
CPC .......... G10L 11/00; G10L 15/02; G10L 25/63
USPC .............. 704/201, 207, 236, 246, 270, 270.1; 381/92
See application file for complete search history.

(56) References Cited

U.S. PATENT DOCUMENTS

| 6,882,971 | B2 * | 4/2005 | Craner ........................... 704/246 |
| 7,373,301 | B2 * | 5/2008 | Kemp et al. ................... 704/275 |
| 7,427,960 | B2 * | 9/2008 | Mizutani et al. .............. 343/702 |
| 7,844,454 | B2 * | 11/2010 | Coles et al. .................... 704/235 |

(Continued)

FOREIGN PATENT DOCUMENTS

| JP | 2006-023506 A | 1/2006 |
| JP | 2007-296169 A | 11/2007 |
| JP | 2010-259691 A | 11/2010 |

*Primary Examiner* — Martin Lerner
(74) *Attorney, Agent, or Firm* — Sughrue Mion, PLLC

(57) ABSTRACT

An audio analysis system includes a terminal apparatus and a host system. The terminal apparatus acquires an audio signal of a sound containing utterances of a user and another person, discriminates between portions of the audio signal corresponding to the utterances of the user and the other person, detects an utterance feature based on the portion corresponding to the utterance of the user or the other person, and transmits utterance information including the discrimination and detection results to the host system. The host system detects a part corresponding to a conversation from the received utterance information, detects portions of the part of the utterance information corresponding to the user and the other person, compares a combination of plural utterance features corresponding to the portions of the part of the utterance information of the user and the other person with relation information to estimate an emotion, and outputs estimation information.

19 Claims, 16 Drawing Sheets

(56) References Cited

U.S. PATENT DOCUMENTS

| | | | |
|---|---|---|---|
| 8,243,902 B2* | 8/2012 | Caspi et al. | 379/202.01 |
| 8,386,257 B2* | 2/2013 | Irie et al. | 704/270 |
| 8,407,055 B2* | 3/2013 | Asano et al. | 704/270 |
| 8,731,213 B2* | 5/2014 | Harada et al. | 381/92 |
| 2003/0139654 A1* | 7/2003 | Kim et al. | 600/300 |
| 2005/0060148 A1* | 3/2005 | Masuda et al. | 704/231 |
| 2005/0088297 A1* | 4/2005 | Miyajima | 340/539.12 |
| 2006/0069559 A1* | 3/2006 | Ariyoshi et al. | 704/246 |
| 2008/0007466 A1* | 1/2008 | Mizutani et al. | 343/702 |
| 2008/0040110 A1* | 2/2008 | Pereg et al. | 704/236 |
| 2011/0131044 A1* | 6/2011 | Fukuda et al. | 704/246 |
| 2013/0080168 A1* | 3/2013 | Iida et al. | 704/246 |
| 2013/0080170 A1* | 3/2013 | Harada et al. | 704/249 |
| 2013/0166298 A1* | 6/2013 | Harada et al. | 704/246 |
| 2013/0166299 A1* | 6/2013 | Shimotani et al. | 704/246 |
| 2013/0173266 A1* | 7/2013 | Nishino et al. | 704/236 |
| 2013/0185076 A1* | 7/2013 | Yoneyama et al. | 704/270 |
| 2013/0191127 A1* | 7/2013 | Iida et al. | 704/246 |
| 2014/0088966 A1* | 3/2014 | Harada et al. | 704/246 |
| 2014/0108011 A1* | 4/2014 | Nishino et al. | 704/246 |

* cited by examiner

FIG. 1
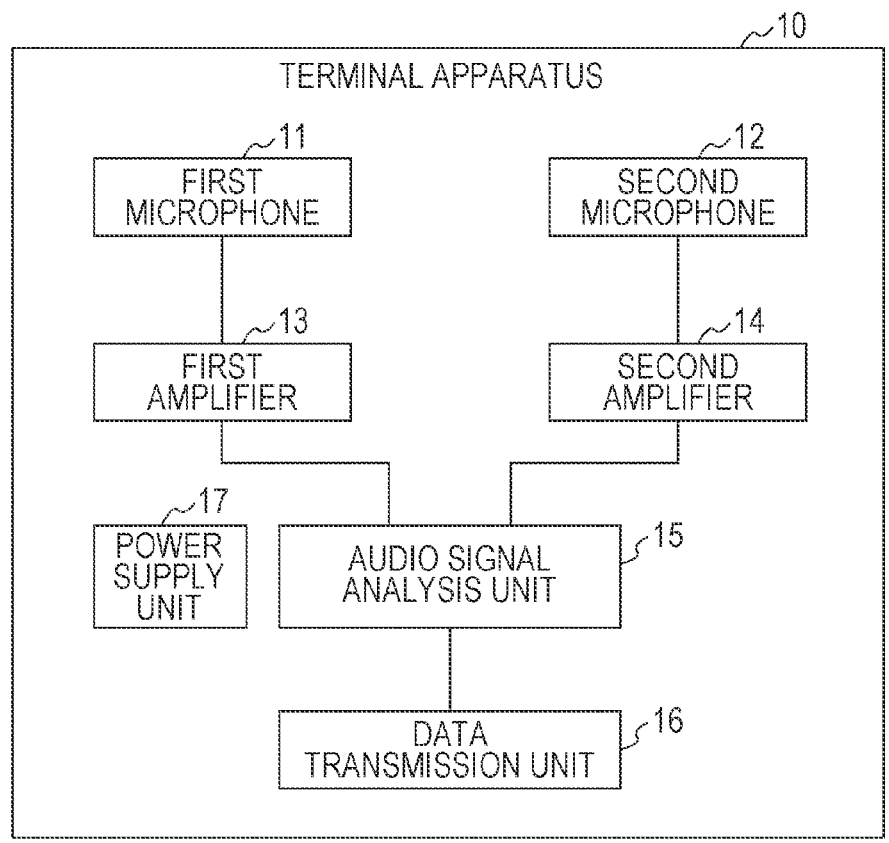
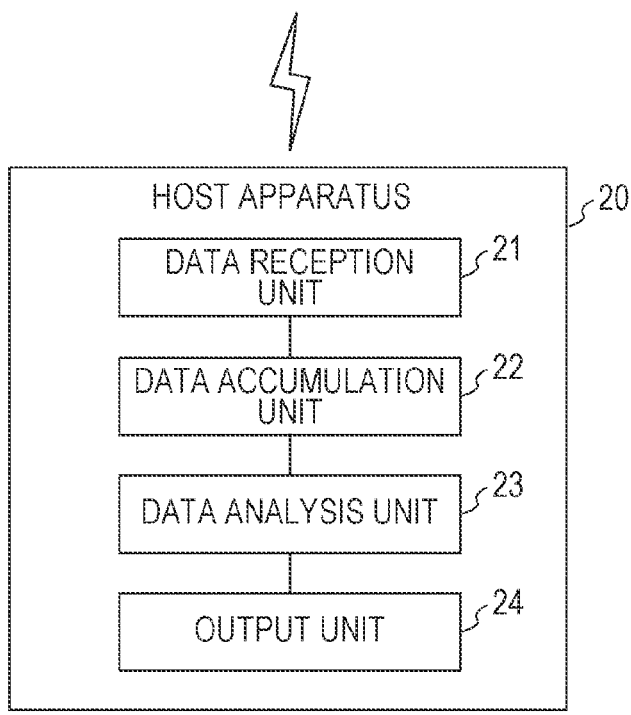

FIG. 11

| | | | -0.4 OR SMALLER | -0.4 TO -0.2 | M2 -0.2 TO 0.2 | 0.2 TO 0.4 | 0.4 OR GREATER |
|---|---|---|---|---|---|---|---|
| M1 | | -0.4 OR SMALLER | E1,1 = 43% <br> E2,1 = 30% <br> E3,1 = 12% <br> E4,1 = 15% | E1,2 = 4% <br> E2,2 = 17% <br> E3,2 = 53% <br> E4,2 = 25% | ⋯ | ⋯ | ⋯ |
| | | -0.4 TO -0.2 | ⋯ | ⋯ | ⋯ | ⋯ | ⋯ |
| | | -0.2 TO 0.2 | ⋯ | ⋯ | ⋯ | ⋯ | ⋯ |
| | | 0.2 TO 0.4 | ● | ⋯ | ⋯ | ▲ | ⋯ |
| | | 0.4 OR GREATER | ⋯ | ⋯ | ⋯ | ⋯ | ⋯ |

OBSERVED VALUE (●)
ESTIMATED RANGE (▲)

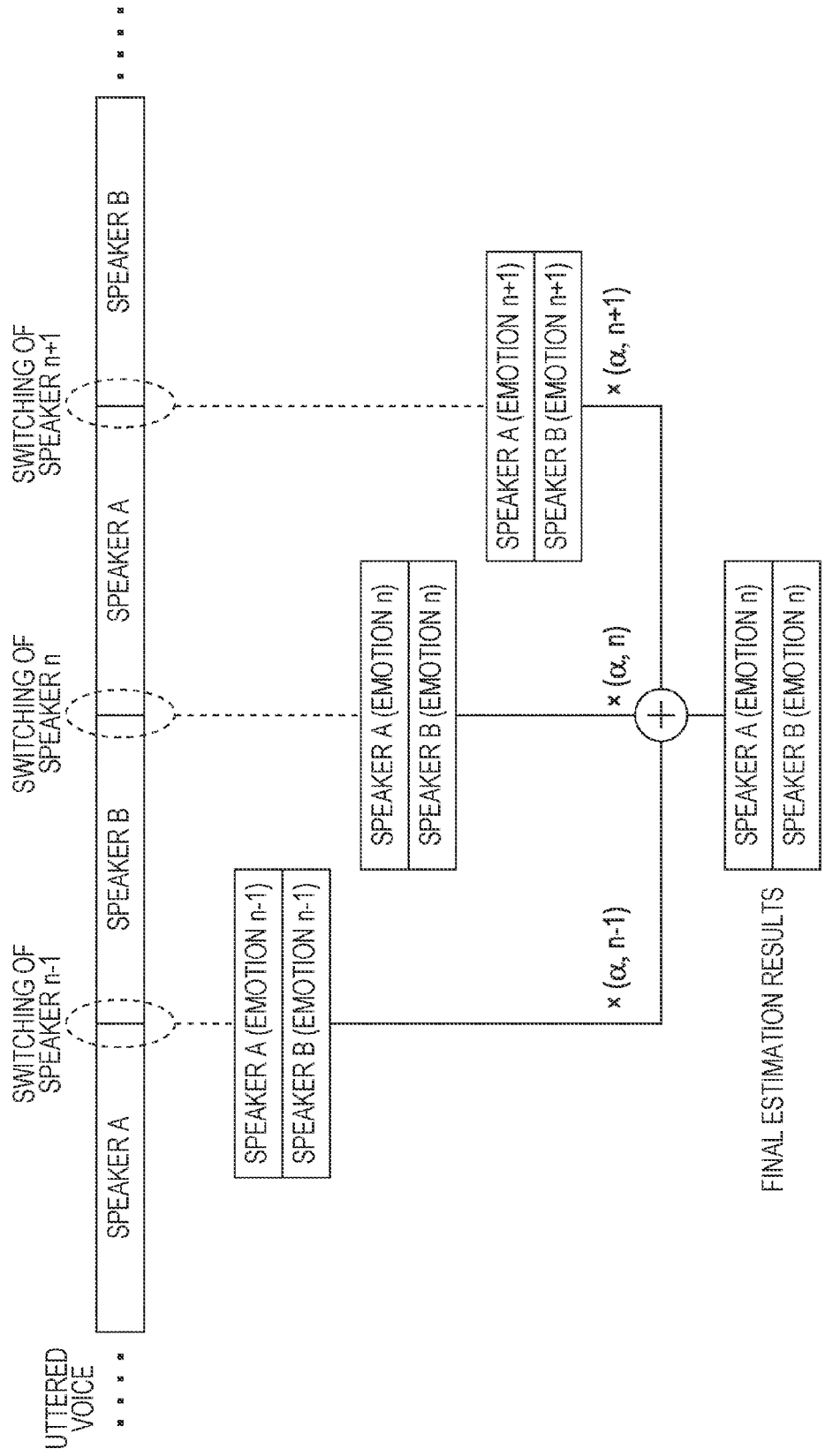

FIG. 13A

PATTERN 1: PRECEDING SPEAKER (HIGH)/
FOLLOWING SPEAKER (HIGH)

| | | FOLLOWING SPEAKER | | | |
|---|---|---|---|---|---|
| | | DELIGHT | ANGER | SORROW | PLEASURE |
| PRECEDING SPEAKER | DELIGHT | 40.0% | 3.3% | 0% | 6.7% |
| | ANGER | 3.3% | 16.7% | 6.7% | 3.3% |
| | SORROW | 3.3% | 6.7% | 0% | 0% |
| | PLEASURE | 3.3% | 3.3% | 0% | 3.3% |

FIG. 13B

PATTERN 2: PRECEDING SPEAKER (HIGH)/
FOLLOWING SPEAKER (LOW)

| | | FOLLOWING SPEAKER | | | |
|---|---|---|---|---|---|
| | | DELIGHT | ANGER | SORROW | PLEASURE |
| PRECEDING SPEAKER | DELIGHT | 0% | 0% | 3.3% | 13.3% |
| | ANGER | 0% | 3.3% | 53.3% | 6.7% |
| | SORROW | 0% | 0% | 3.3% | 0% |
| | PLEASURE | 3.3% | 0% | 6.7% | 6.7% |

FIG. 13C

PATTERN 3: PRECEDING SPEAKER (LOW)/
FOLLOWING SPEAKER (HIGH)

| | | FOLLOWING SPEAKER | | | |
|---|---|---|---|---|---|
| | | DELIGHT | ANGER | SORROW | PLEASURE |
| PRECEDING SPEAKER | DELIGHT | 3.3% | 0% | 0% | 3.3% |
| | ANGER | 0% | 6.7% | 3.3% | 0% |
| | SORROW | 3.3% | 36.7% | 3.3% | 0% |
| | PLEASURE | 20.0% | 13.3% | 6.7% | 0% |

FIG. 13D

PATTERN 4: PRECEDING SPEAKER (LOW)/
FOLLOWING SPEAKER (LOW)

| | | FOLLOWING SPEAKER | | | |
|---|---|---|---|---|---|
| | | DELIGHT | ANGER | SORROW | PLEASURE |
| PRECEDING SPEAKER | DELIGHT | 0% | 0% | 0% | 3.3% |
| | ANGER | 0% | 0% | 6.7% | 3.3% |
| | SORROW | 0% | 3.3% | 20.0% | 6.7% |
| | PLEASURE | 6.7% | 0% | 6.7% | 43.3% |

FIG. 14

| | | M2 | | |
|---|---|---|---|---|
| | | -0.3 OR SMALLER | -0.3 TO 0.3 | 0.3 OR GREATER |
| M1 | -0.3 OR SMALLER | PRECEDING SPEAKER<br>DELIGHT = 3.3%<br>ANGER = 10.0%<br>SORROW = 30.0%<br>PLEASURE = 56.7%<br><br>FOLLOWING SPEAKER<br>DELIGHT = 6.7%<br>ANGER = 3.3%<br>SORROW = 33.4%<br>PLEASURE = 56.6% | | PRECEDING SPEAKER<br>DELIGHT = 6.6%<br>ANGER = 10.0%<br>SORROW = 43.4%<br>PLEASURE = 40.0%<br><br>FOLLOWING SPEAKER<br>DELIGHT = 26.6%<br>ANGER = 56.7%<br>SORROW = 13.4%<br>PLEASURE = 3.3% |
| | -0.3 TO 0.3 | | | |
| | 0.3 OR GREATER | PRECEDING SPEAKER<br>DELIGHT = 16.7%<br>ANGER = 63.3%<br>SORROW = 3.3%<br>PLEASURE = 16.7%<br><br>FOLLOWING SPEAKER<br>DELIGHT = 3.3%<br>ANGER = 3.3%<br>SORROW = 66.7%<br>PLEASURE = 26.7% | | PRECEDING SPEAKER<br>DELIGHT = 50.0%<br>ANGER = 30.0%<br>SORROW = 10.0%<br>PLEASURE = 10.0%<br><br>FOLLOWING SPEAKER<br>DELIGHT = 50.0%<br>ANGER = 30.0%<br>SORROW = 6.7%<br>PLEASURE = 13.3% |

AUDIO ANALYSIS TERMINAL AND SYSTEM FOR EMOTION ESTIMATION OF A CONVERSATION THAT DISCRIMINATES UTTERANCE OF A USER AND ANOTHER PERSON

CROSS-REFERENCE TO RELATED APPLICATIONS

This application is based on and claims priority under 35 USC 119 from Japanese Patent Application No. 2011-211480 filed Sep. 27, 2011.

BACKGROUND (i) Technical Field

The present invention relates to audio analysis systems, audio analysis apparatuses, and audio analysis terminals.

SUMMARY

According to an aspect of the invention, there is provided an audio analysis system including a terminal apparatus and a host system. The terminal apparatus is to be worn by a user. The host system acquires information from the terminal apparatus. The terminal apparatus includes a first audio acquisition device, a discriminator, an utterance feature detector, and a transmission unit. The first audio acquisition device acquires a sound and converts the sound into a first audio signal. The sound contains an utterance of the user and an utterance of another person who is different from the user. The discriminator discriminates between a portion that corresponds to the utterance of the user and a portion that corresponds to the utterance of the other person which are contained in the first audio signal. The utterance feature detector detects an utterance feature of the user or the other person, on the basis of the portion that corresponds to the utterance of the user or the portion that corresponds to the utterance of the other person. The transmission unit transmits to the host system utterance information that contains at least a discrimination result obtained by the discriminator and a detection result obtained by the utterance feature detector. The host system includes a reception unit, a conversation information detector, a relation information holding unit, an emotion estimator, and an output unit. The reception unit receives the utterance information that has been transmitted from the transmission unit. The conversation information detector detects a part corresponding to a first conversation between the user and the other person from the utterance information that has been received by the reception unit, and detects portions of the part of the utterance information that correspond to the user and the other person who are related to the first conversation. The relation information holding unit holds relation information on a relation between a predetermined emotion name and a combination of a plurality of the utterance features of a plurality of speakers who participated in a past conversation. The emotion estimator compares, with the relation information, a combination of a plurality of the utterance features that correspond to the portions of the part of the utterance information of the user and the other person who are related to the first conversation, and estimates an emotion of at least one of the user and the other person. The output unit outputs information that is based on an estimation result obtained by the emotion estimator.

BRIEF DESCRIPTION OF THE DRAWINGS

Exemplary embodiment(s) of the present invention will be described in detail based on the following figures, wherein:

FIG. 1 is a diagram illustrating an example of a configuration of an audio analysis system according to an exemplary embodiment;

FIG. 11 is a diagram illustrating an example of a lookup table for use in a method for creating a lookup table, among the methods for estimating an emotion of a speaker according to the exemplary embodiment;

FIG. 12 is a diagram illustrating a process in which an emotion of a speaker is estimated every time the speaker is switched so as to obtain a final estimation result in the exemplary embodiment;

FIGS. 13A to 13D are diagrams illustrating examples of occurrence probabilities of emotions of conversation participants (speakers) for individual patterns of mental states;

FIG. 14 is a diagram illustrating an example of a lookup table used in the exemplary embodiment;

DETAILED DESCRIPTION

Figure 2:
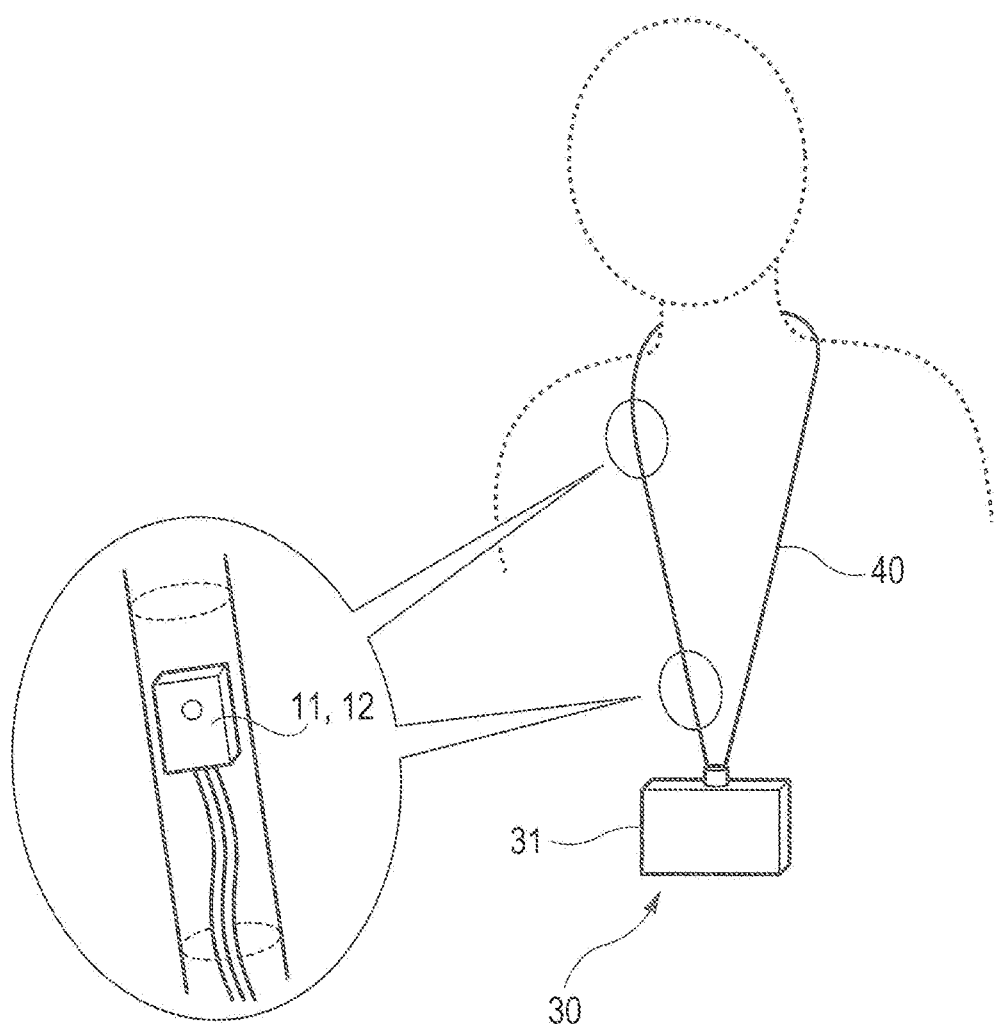
FIG. 2 is a diagram illustrating an example of a configuration of a terminal apparatus used in the exemplary embodiment.

An exemplary embodiment of the present invention will be described in detail below with reference to the accompanying drawings.

FIG. 1 is a diagram illustrating an example of a configuration of an audio analysis system according to an exemplary embodiment.

As illustrated in FIG. 1, the audio analysis system according to this exemplary embodiment includes a terminal apparatus 10 and a host apparatus 20. The terminal apparatus 10 is connected to the host apparatus 20 via a wireless communication network. As types of the wireless communication network, networks based on existing schemes, such as wireless fidelity (Wi-Fi (trademark)), Bluetooth (trademark), ZigBee (trademark), and ultra wideband (UWB), may be used. Although one terminal apparatus 10 is illustrated in the example, as many terminal apparatuses 10 as the number of users are actually prepared because the terminal apparatus 10 is worn and used by each user, as described in detail later. Hereinafter, a user wearing the terminal apparatus 10 is referred to as a wearer.

The terminal apparatus 10 includes, as audio acquisition devices, at least a set of microphones (e.g., a first microphone 11 and a second microphone 12) and a set of amplifiers (e.g., a first amplifier 13 and a second amplifier 14). The terminal apparatus 10 also includes, as a processor, an audio signal analysis unit 15 that analyzes recorded audio signals and a data transmission unit 16 that transmits an analysis result to the host apparatus 20. The terminal apparatus 10 further includes a power supply unit 17.

The first microphone 11 and the second microphone 12 are arranged at positions where distances of acoustic wave propagation paths (hereinafter, simply referred to as "distances") from the mouth (voice emitting portion) of a wearer differ from one another. It is assumed here that the first microphone 11 is arranged at a farther position (e.g., approximately 35 centimeters apart) from the mouth of the wearer, whereas the second microphone 12 is arranged at a nearer position (e.g., approximately 10 centimeters apart) from the mouth of the wearer. Microphones of various existing types, such as dynamic microphones or condenser microphones, may be used as the first microphone 11 and the second microphone 12 in this exemplary embodiment. Particularly, non-directional micro electro mechanical system (MEMS) microphones are desirably used.

The first amplifier 13 and the second amplifier 14 amplify electric signals (audio signals) that are output by the first microphone 11 and the second microphone 12 in accordance with the acquired sound, respectively. Existing operational amplifiers or the like may be used as the first amplifier 13 and the second amplifier 14 in this exemplary embodiment.

The audio signal analysis unit 15 analyzes the audio signals output from the first amplifier 13 and the second amplifier 14. The audio signal analysis unit 15 discriminates whether the sound acquired by the first microphone 11 and the second microphone 12 is a voice uttered by the wearer who is wearing the terminal apparatus 10 or a voice uttered by another person. That is, the audio signal analysis unit 15 functions as a discriminator that discriminates a speaker of the voice on the basis of the sound acquired by the first microphone 11 and the second microphone 12. Concrete content of a speaker discrimination process will be described later.

The audio signal analysis unit 15 also analyzes the audio signal output from the first amplifier 13 or the second amplifier 14, and detects utterance features of speakers (i.e., the wearer and the other person). That is, the audio signal analysis unit 15 functions as an utterance feature detector that detects an utterance feature of a speaker of a voice on the basis of an audio signal of the sound acquired by the first microphone 11 or the second microphone 12. Here, the utterance feature is information that reflects a mental state of a speaker. It is generally considered that there is a specific probable relationship between the mental state of the speaker and the voice uttered by the speaker. For example, a voice uttered by an excited speaker tends to crack or to be louder than a voice uttered in the usual mental state. In contrast, when a speaker is relaxed or feels depressed, the volume or pitch of the voice uttered by the speaker does not change much. Accordingly, in this exemplary embodiment, the utterance feature is represented by a change in a predetermined feature value which is obtained by analyzing the acquired audio signal. As the feature value of the audio signal, an average sound pressure, a change in sound pressure, a sound pressure distribution, an average pitch (pitch of a voice), a change in pitch, or a pitch distribution may be used. Concrete content of a process of computing the feature value and a process of determining the utterance feature will be described later.

The data transmission unit 16 transmits an ID of the terminal apparatus 10 and data including an analysis result obtained by the audio signal analysis unit 15, to the host apparatus 20 via the wireless communication network. The information to be transmitted to the host apparatus 20 may include, for example, information on the acquisition times of a sound acquired by the first microphone 11 and the second microphone 12 and sound pressures of the acquired sound in addition to the analysis result, depending on content of the process performed in the host apparatus 20. Additionally, the terminal apparatus 10 may include a data accumulation unit that accumulates analysis results obtained by the audio signal analysis unit 15. The data accumulated over a predetermined period may be collectively transmitted. Also, the data may be transmitted via a wired network.

The power supply unit 17 supplies electric power to the first microphone 11, the second microphone 12, the first amplifier 13, the second amplifier 14, the audio signal analysis unit 15, and the data transmission unit 16. As the power supply, an existing power supply, such as a battery or rechargeable battery, may be used. The power supply unit 17 may also include known circuits, such as a voltage conversion circuit and a charge control circuit.

The host apparatus 20 includes a data reception unit 21 that receives data that has been transmitted from the terminal apparatus 10, a data accumulation unit 22 that accumulates the received data, a data analysis unit 23 that analyzes the accumulated data, and an output unit 24 that outputs an analysis result. The host apparatus 20 is implemented by an information processing apparatus, e.g., a personal computer. Additionally, as described above, the plural terminal apparatuses 10 are used in this exemplary embodiment, and the host apparatus 20 receives data from each of the plural terminal apparatuses 10.

The data reception unit 21 is compatible with the wireless communication network, receives data from each terminal apparatus 10, and sends the received data to the data accumulation unit 22. The data accumulation unit 22 is implemented by a storage device, e.g., a magnetic disk device of the personal computer. The data accumulation unit 22 accumulates, for each speaker, the received data acquired from the data reception unit 21. Here, a speaker is identified by comparing the terminal ID that has been transmitted from the terminal apparatus 10 with a terminal ID that is pre-registered in the host apparatus 20, and determining a speaker name that is pre-registered with the terminal ID. Additionally, a wearer name may be transmitted from the terminal apparatus 10 instead of the terminal ID.

The data analysis unit 23 is implemented by, for example, a central processing unit (CPU) of the personal computer which is controlled on the basis of programs. The data analysis unit 23 analyzes the data accumulated in the data accumulation unit 22. Various contents and methods of analysis are adoptable as concrete contents and methods of the analysis in accordance with the use purpose and application of the audio analysis system according to this exemplary embodiment. For example, the frequency of conversions carried out between wearers of the terminal apparatuses 10 and a tendency of a conversation partner of each wearer are analyzed or a relationship between partners of a conversation is estimated from information on durations and sound pressures of utterances made by corresponding speakers in the conversation.

As one of the data analysis processes, the data analysis unit 23 according to this exemplary embodiment estimates emotions of conversation participants in a conversation situation, using information on utterance features of speakers obtained from audio analysis performed in the terminal apparatus 10. That is, on the basis of a combination of utterance features of the conversation participants, the data analysis unit 23 identifies emotions of the conversation participants between which such a combination of utterance features may occur. Concrete content of the process of estimating emotions of conversation participants will be described later.

The output unit 24 outputs an analysis result obtained by the data analysis unit 23 and data based on the analysis result. Various methods, such as displaying with a display, printing with a printer, and outputting a sound, may be adoptable in accordance with the use purpose and application of the audio analysis system and the content and format of the analysis result.

FIG. 2 is a diagram illustrating an example of a configuration of the terminal apparatus 10.

As described above, the terminal apparatus 10 is worn and used by each user. In order to permit a user to wear the terminal apparatus 10, the terminal apparatus 10 according to this exemplary embodiment includes a main body 30 and a strap 40 that is connected to the main body 30, as illustrated in FIG. 2. In the illustrated configuration, a user wears the strap 40 around their neck to hang the main body 30 from their neck.

The main body 30 includes a thin rectangular parallelepiped casing 31, which is formed of metal, resin, or the like and which contains at least circuits implementing the first amplifier 13, the second amplifier 14, the audio signal analysis unit 15, the data transmission unit 16, and the power supply unit 17, and a power supply (battery) of the power supply unit 17. The casing 31 may have a pocket into which an ID card displaying ID information, such as the name and the section of the wearer, is to be inserted. Additionally, such ID information may be printed on the casing 31 or a sticker having the ID information written thereon may be adhered onto the casing 31.

The strap 40 includes the first microphone 11 and the second microphone 12 (hereinafter, the first microphone 11 and the second microphone 12 are referred to as microphones 11 and 12 when distinction is not needed). The microphones 11 and 12 are connected to the first amplifier 13 and the second amplifier 14 contained in the main body 30, respectively, via cables (wirings) extending inside the strap 40. Various existing materials, such as leather, synthetic leather, natural fibers such as cotton, synthetic fibers made of resins or the like, and metal, may be used as the material of the strap 40. The strap 40 may be coated using silicone resins, fluorocarbon resins, etc.

The strap 40 has a tubular structure and contains the microphones 11 and 12 therein. By disposing the microphones 11 and 12 inside the strap 40, damages and stains of the microphones 11 and 12 are avoided and conversation participants become less conscious of the presence of the microphones 11 and 12. Meanwhile, the first microphone 11 which is located at a farther position from the mouth of a wearer may be disposed in the main body 30, i.e., inside the casing 31. In this exemplary embodiment, however, the description will be given for an example case where the first microphone 11 is disposed in the strap 40.

Referring to FIG. 2, the first microphone 11 is disposed at an end portion of the strap 40 to be connected to the main body 30 (e.g., at a position within 10 centimeters from a connection part). In this way, the first microphone 11 is arranged at a position separate from the mouth of the wearer by approximately 30 to 40 centimeters in a state where the wearer wears the strap 40 around their neck to hang the main body 30 from their neck. When the first microphone 11 is disposed in the main body 30, the distance between the mouth of the wearer and the first microphone 11 is kept substantially the same.

The second microphone 12 is disposed at a position away from the end portion of the strap 40 to be connected to the main body 30 (e.g., a position separate from the connection part by approximately 20 to 30 centimeters). In this way, the second microphone 12 is located near the neck (e.g., a position of the collarbone) and is located at a position separate from the mouth of the wearer by appropriately 10 to 20 centimeters, in a state where the wearer wears the strap 40 around their neck to hang the main body 30 from their neck.

The configuration of the terminal apparatus 10 according to this exemplary embodiment is not limited to the one illustrated in FIG. 2. For example, a positional relationship between the first microphone 11 and the second microphone 12 is desirably specified so that the distance between the first microphone 11 and the mouth of the wearer is several times as large as the distance between the second microphone 12 and the mouth of the wearer. Accordingly, the first microphone 11 may be disposed in the strap 40 to be located behind the neck. Additionally, the microphones 11 and 12 are not necessarily disposed in the strap 40. The wearer may wear the microphones 11 and 12 using various tools. For example, the first microphone 11 and the second microphone 12 may be fixed to the clothes with pins or the like. Additionally, a dedicated wear may be prepared and worn which is designed so that the first microphone 11 and the second microphone 12 are fixed at desired positions.

Additionally, the configuration of the main body 30 is not limited to the one illustrated in FIG. 2 in which the main body 30 is connected to the strap 40 and is hung from the neck of the wearer. The main body 30 may be desirably configured as an easy-to-carry apparatus. For example, unlike this exemplary embodiment, the main body 30 may be attached to clothes or body with clips or belts instead of the strap 40 or may be simply stored in a pocket and carried. Furthermore, a function for receiving audio signals from the microphones 11 and 12, amplifying and analyzing the audio signals may be implemented in existing mobile electronic information terminals, such as mobile phones. When the first microphone 11 is disposed in the main body 30, the position of the main body 30 is specified when being carried because the positional relationship between the first microphone 11 and the second microphone 12 has to be held as described above.

Moreover, the microphones 11 and 12 may be connected to the main body 30 (or the audio signal analysis unit 15) via wireless communication instead of using cables. Although the first amplifier 13, the second amplifier 14, the audio signal analysis unit 15, the data transmission unit 16, and the power supply unit 17 are contained in a single casing 31 in the above configuration example, these units may be configured as plural independent devices. For example, the power supply unit 17 may be removed from the casing 31 and the terminal apparatus 10 may be connected to an external power supply and used.

A speaker discrimination method according to this exemplary embodiment will be described next.

The audio analysis system according to this exemplary embodiment discriminates between an uttered voice of a wearer of the terminal apparatus 10 and an uttered voice of another person using audio information recorded by the two microphones 11 and 12 disposed in the terminal apparatus 10. That is, in this exemplary embodiment, whether a speaker of the recorded voice is the wearer or the other person is discriminated. Additionally, in this exemplary embodiment, speakers are discriminated on the basis of feature values, which are nonverbal information of the recorded audio information, such as sound pressures (sound volumes input to the microphones 11 and 12), instead of verbal information obtained by using morphological analysis and dictionary information. That is, speakers of voices are discriminated on the basis of an utterance state identified from nonverbal information, instead of utterance content identified from verbal information.

As described with reference to FIGS. 1 and 2, in this exemplary embodiment, the first microphone 11 of the terminal apparatus 10 is arranged at a farther position from the mouth of the wearer, whereas the second microphone 12 is arranged at a nearer position from the mouth of the wearer. When the mouth of the wearer is assumed as a sound source, a distance between the first microphone 11 and the sound source greatly differs from a distance between the second microphone 12 and the sound source. Specifically, the distance between the first microphone 11 and the sound source is approximately one-and-half to four times as large as the distance between the second microphone 12 and the sound source. Meanwhile, a sound pressure of audio recorded at the microphone 11 or 12 attenuates (space attenuation) in proportion to the distance between the microphone 11 or 12 and the sound source. Accordingly, regarding a voice uttered by the wearer, a sound pressure of the sound recorded at the first microphone 11 greatly differs from a sound pressure of the sound recorded at the second microphone 12.

On the other hand, when the mouth of a non-wearer (another person) is assumed as a sound source, the distance between the first microphone 11 and the sound source does not greatly differ from the distance between the second microphone 12 and the sound source because the other person is apart from the wearer. Although the distances may differ depending on the position of the other person against the wearer, the distance between the first microphone 11 and the sound source does not become several times as large as the distance between the second microphone 12 and the sound source, unlike the case where the mouth of the wearer is assumed as the sound source. Accordingly, regarding a voice uttered by the other person, a sound pressure of the sound recorded at the first microphone 11 does not greatly differ from a sound pressure of the sound recorded at the second microphone 12, unlike a voice uttered by the wearer.

Figure 3:
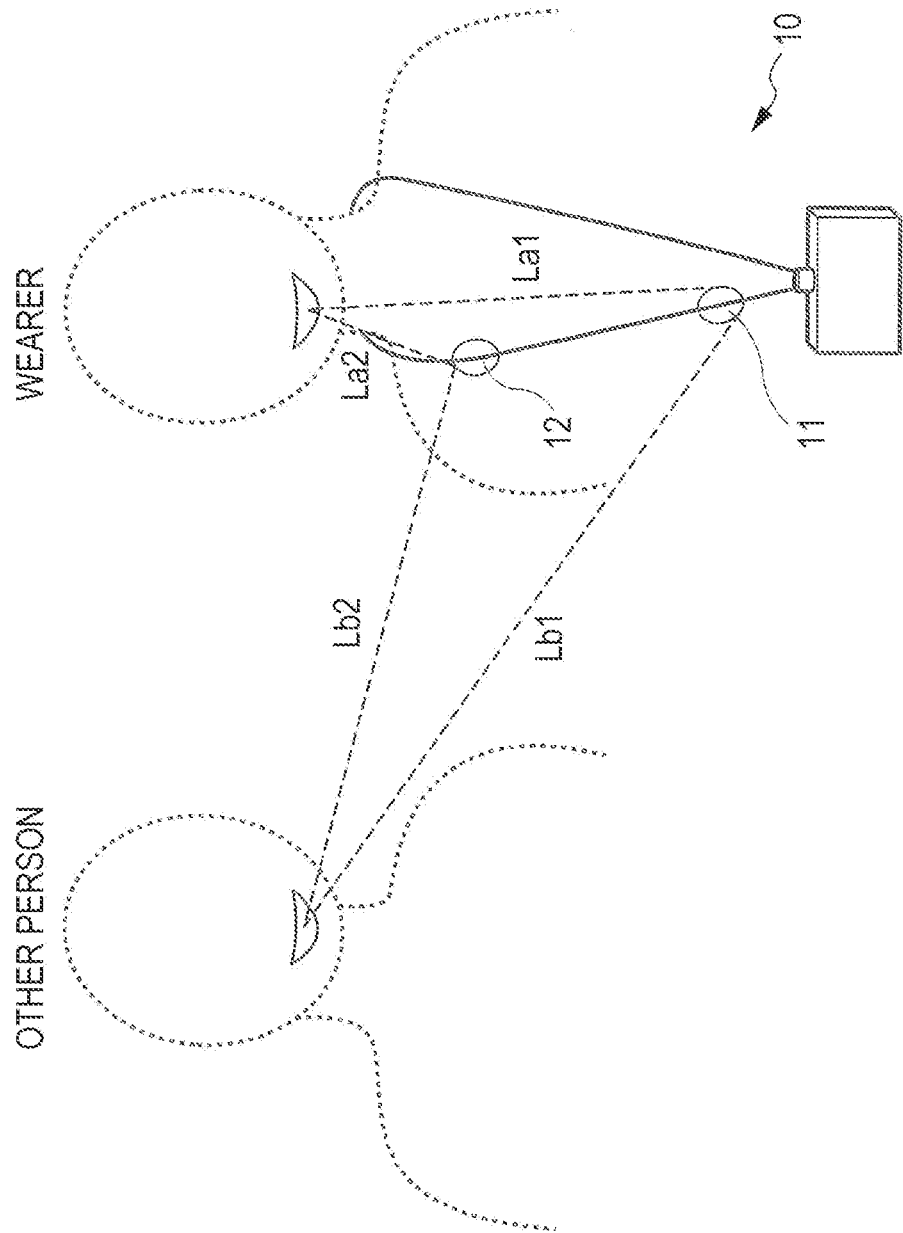
FIG. 3 is a diagram illustrating positional relationships between microphones and mouths (voice emitting portions) of a wearer and another person.

FIG. 3 is a diagram illustrating positional relationships between mouths of the wearer and the other person and the microphones 11 and 12.

In the relationships illustrated in FIG. 3, a distance between a sound source "a", i.e., the mouth of the wearer, and the first microphone 11 and a distance between the sound source "a" and the second microphone 12 are denoted as "La1" and "La2", respectively. Additionally, a distance between a sound source "b", i.e., the mouth of the other person, and the first microphone 11 and a distance between the sound source "b" and the second microphone 12 are denoted as "Lb1" and "Lb2", respectively. In this case, the following relations are satisfied.

$$La1 > La2 (La1 \approx 1.5 \times La2 \text{ to } 4 \times La2)$$

$$Lb1 \approx Lb2$$

Figure 4:
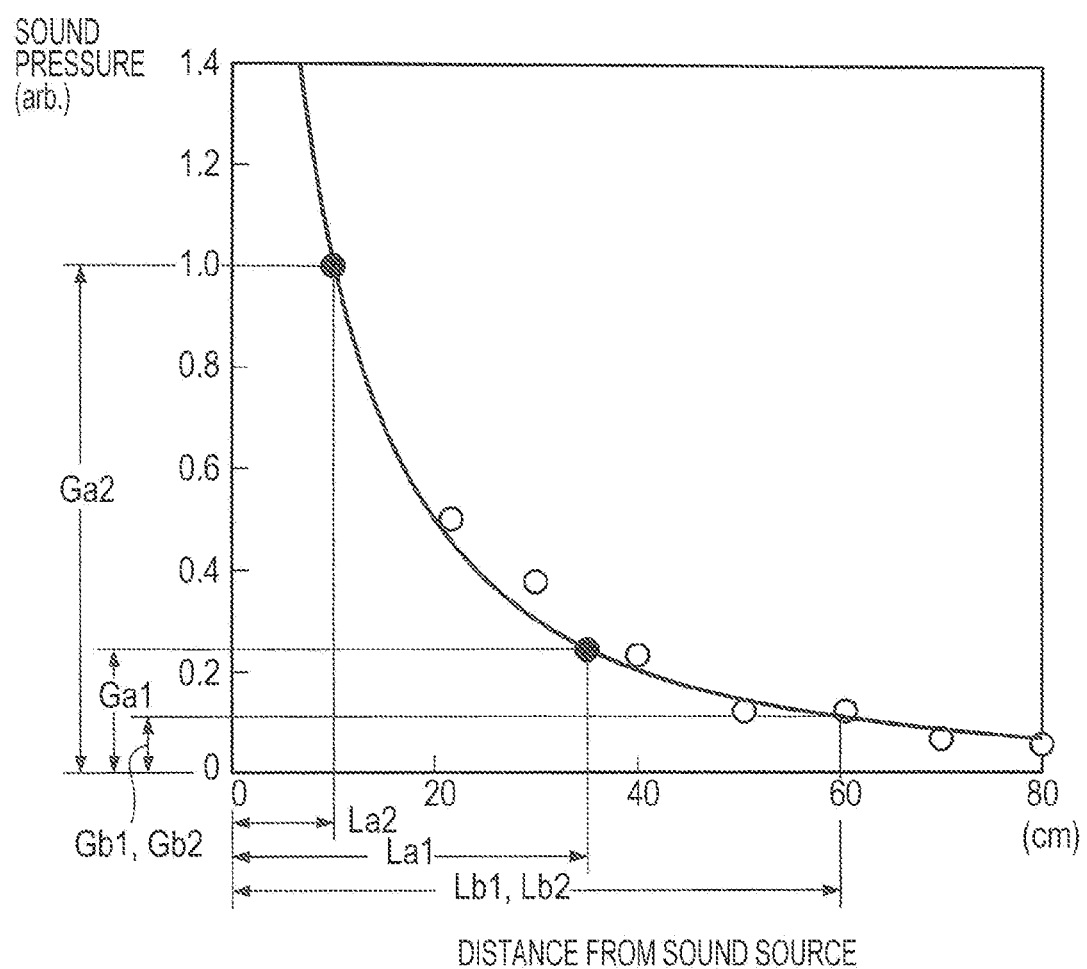
FIG. 4 is a diagram illustrating a relationship between a sound pressure (input sound volume) and a distance of an acoustic wave propagation path between a microphone and a sound source.

FIG. 4 is a diagram illustrating a relationship between a sound pressure (input sound volume) and a distance between the sound source and the microphone 11 or 12.

As described above, sound pressures attenuate depending on the distances between the sound source and the microphones 11 and 12. In FIG. 4, when a sound pressure Ga1 corresponding to the distance La1 is compared to a sound pressure Ga2 corresponding to the distance La2, the sound pressure Ga2 is approximately four times as large as the sound pressure Ga1. On the other hand, a sound pressure Gb1 corresponding to the distance Lb1 is substantially equal to a sound pressure Gb2 corresponding to the distance Lb2 because the distance Lb1 is substantially equal to the distance Lb2. Accordingly, in this exemplary embodiment, a voice uttered by the wearer and a voice uttered by the other person contained in recorded audio are discriminated by using a difference in the sound pressure ratio. Although the distances Lb1 and Lb2 are set substantially equal to 60 centimeters in the example illustrated in FIG. 4, the distances Lb1 and Lb2 are not limited to the illustrated values since that fact that the sound pressure Gb1 is substantially equal to the sound pressure Gb2 has the meaning.

Figure 5:
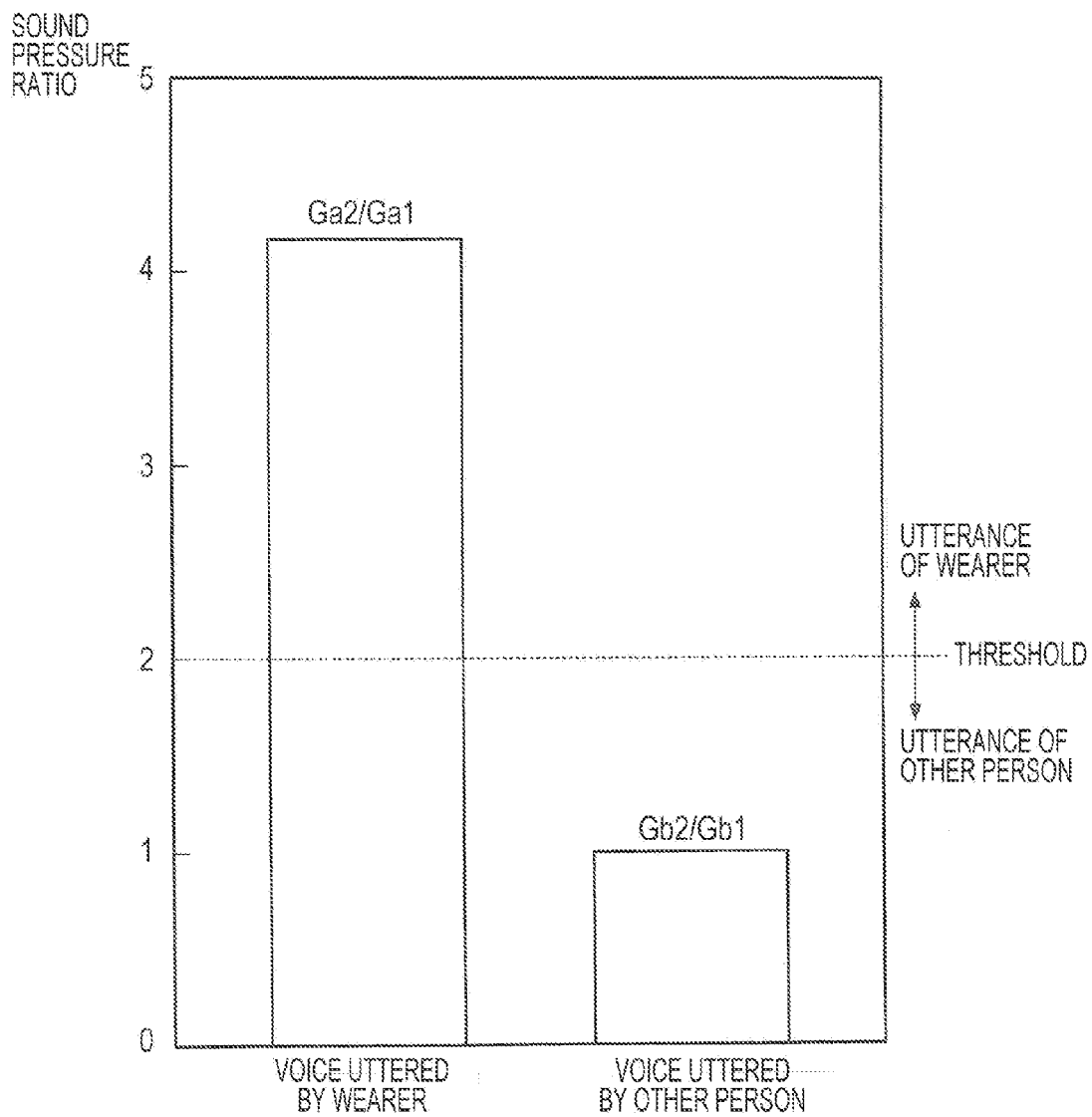
FIG. 5 is a diagram illustrating a method for discriminating between a voice uttered by a wearer and a voice uttered by another person.

FIG. 5 is a diagram illustrating a method for discriminating between a voice uttered by the wearer and a voice uttered by the other person.

As described with reference to FIG. 4, regarding the voice uttered by the wearer, the sound pressure Ga2 at the second microphone 12 is several times (e.g., four times) as large as the sound pressure Ga1 at the first microphone 11. Additionally, regarding the voice uttered by the other person, the sound pressure Gb2 at the second microphone 12 is substantially equal to (approximately as large as) the sound pressure Gb1 at the first microphone 11. Accordingly, in this exemplary embodiment, a threshold is set for a ratio of the sound pressure at the second microphone 12 to the sound pressure at the first microphone 11. If the sound pressure ratio is larger than or equal to the threshold, the voice is determined to be uttered by the wearer. If the sound pressure ratio is smaller than the threshold, the voice is determined to be uttered by the other person. In the example illustrated in FIG. 5, the threshold is set equal to "2". Since a sound pressure ratio Ga2/Ga1 exceeds the threshold "2", the voice is determined to be uttered by the wearer. Similarly, since a sound pressure ratio Gb2/Gb1 is smaller than the threshold "2", the voice is determined to be uttered by the other person.

Meanwhile, the sound recorded by the microphones 11 and 12 includes so-called noise, such as ambient noise, in addition to uttered voices. The relationship of distances between a sound source of the noise and the microphones 11 and 12 resembles that for the voice uttered by the other person. When a distance between a sound source "c" of the noise and the first microphone 11 and a distance between the sound source "c" and the second microphone 12 are denoted as Lc1 and Lc2, respectively, the distance Lc1 is substantially equal to the distance Lc2 according to the examples illustrated in FIGS. 4 and 5. Accordingly, a sound pressure ratio Gc2/Gc1 in the sound recorded with the microphones 12 and 11 is smaller than the threshold "2". However, such noise is separated from uttered voices by performing filtering processing using existing techniques, such as a band-pass filter and a gain filter.

Next, a description will be given for a method for detecting an utterance feature of a speaker according to this exemplary embodiment.

In this exemplary embodiment, a feature value (audio feature value) of an audio signal that has been acquired with the first microphone 11 or the second microphone 12 is determined for each continuous utterance (utterance that continues without a silent interval of a predetermined period or longer) of each speaker. The utterance feature of the speaker is denoted by a change in the audio feature value for each utterance. As described above, an average sound pressure, a change in sound pressure, a sound pressure distribution, an average pitch (pitch of a voice), a change in pitch, or a pitch distribution may be used as the audio feature value. Existing techniques may be used as methods for computing the audio feature values. For example, the audio feature values may be determined in the following manner.

An average sound pressure is determined by converting signal levels of an audio signal for a continuous utterance into absolute values, summing the resulting absolute values, and dividing the resulting sum by duration of the continuous utterance.

A change in sound pressure is determined as a difference between the maximum value and the minimum value of peaks in a graph of the sound pressure denoted as absolute values. The peaks of the sound pressure graph are determined, for example, as positive-to-negative zero crossing points of the first derivative of the sound pressure graph.

A sound pressure distribution is determined as the standard deviation when the sound pressure histogram is fitted to the normal distribution.

Pitch (the highness of voice or fundamental frequency F0) is determined with a waveform method, a correlation method, a spectral method, and so forth. An average pitch is determined by summing pitch values of an audio signal for a continuous utterance, and dividing the resulting sum by duration of the continuous utterance.

A change in pitch is determined as a difference between the maximum value and the minimum value of the pitch.

A pitch distribution is determined as the standard deviation when the pitch histogram is fitted to the normal distribution.

In this exemplary embodiment, the utterance feature is represented on the basis of a difference between the audio feature value for each continuous utterance that has been determined in the above manner and the usual audio feature value of the same speaker. Specifically, how much the audio feature value for each utterance differs from the usual audio feature value of the speaker is determined, and the determined difference is used as the utterance feature of the speaker in the utterance (target utterance). Here, as the usual audio feature value, an average of audio feature values in utterances performed by the speaker during a predetermined past period is used. As the difference between the audio feature values, an amount of change in absolute values or normalized change ratio may be used.

Furthermore, in this exemplary embodiment, the utterance feature may be denoted by any one of the six audio feature values illustrated above, or may be denoted by averaging out multiple audio feature values or by weighting individual audio feature values before averaging out. For example, suppose that a weight for an audio feature value "i", a value of the audio feature value "i" in a target utterance, and a usual audio feature value of a speaker of the target utterance related to the audio feature values "i" (average of the audio feature values i in utterances performed during a predetermined past period) are denoted as "αi", "Gi", and "Gi,ave", respectively. The utterance feature M is denoted in the following manner.

$$M = \Sigma(\alpha i \times (Gi - Gi,\text{ave})/Gi,\text{ave})$$

The average of the audio feature values in utterances performed during the predetermined past period, which is used as the usual audio feature value, may be updated by adding the audio feature value in the utterance every time an utterance is performed. The updated value is used when the utterance feature is determined for the next utterance. Additionally, the average of the audio feature values in utterances performed during a prefixed period may be used in a fixed manner.

When the same terminal apparatus 10 (individual device) is not always worn by the same user, the terminal apparatus 10 acquires the audio feature value every time an utterance is performed from when the terminal apparatus 10 is turned on or reset, and accumulates the history, thereby determining the usual audio feature value. In this case, an error occurrence rate increases immediately after the use of the terminal apparatus 10 is started since the amount of the history is small, but the error occurrence rate becomes stable as the conversation progresses.

Figure 6:
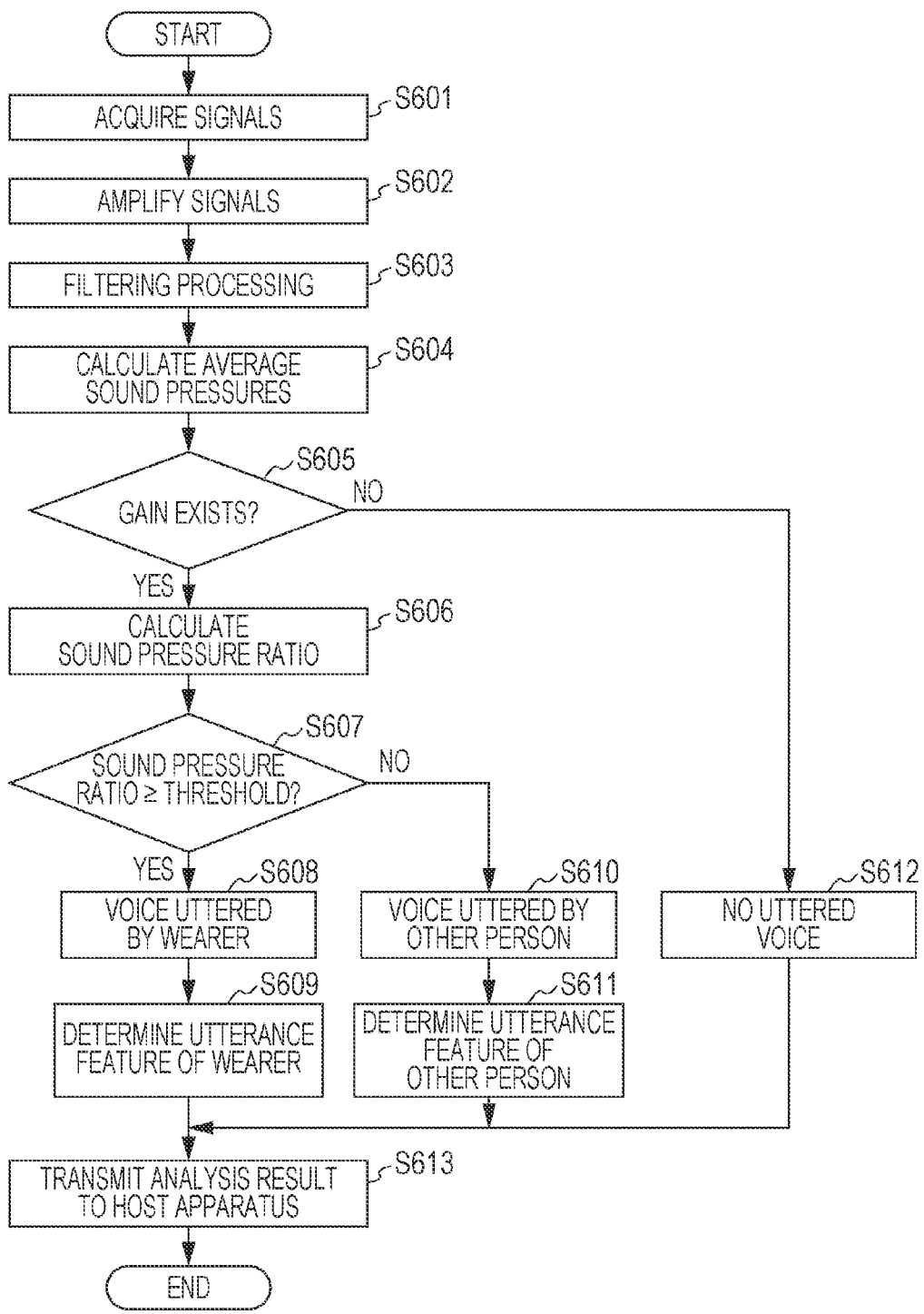
FIG. 6 is a flowchart illustrating an operation of the terminal apparatus in the exemplary embodiment.

FIG. 6 is a flowchart illustrating an operation of the terminal apparatus 10 in this exemplary embodiment.

As illustrated in FIG. 6, once the microphones 11 and 12 of the terminal apparatus 10 acquire a sound, electric signals (audio signals) corresponding to the acquired sound are sent to the first amplifier 13 and the second amplifier 14 from the microphone 11 and 12, respectively (step S601). Upon acquiring the audio signals from the microphones 11 and 12, the first amplifier 13 and the second amplifier 14 amplify the signals, and send the amplified signals to the audio signal analysis unit 15, respectively (step S602).

The audio signal analysis unit 15 performs filtering processing on the signals amplified by the first amplifier 13 and the second amplifier 14 to remove noise, such as ambient noise, from the signals (step S603). The audio signal analysis unit 15 then determines an average sound pressure of the sound recorded by each of the microphones 11 and 12 at predetermined intervals (e.g., several tenths of a second to several hundredths of a second) from the noise-component removed signals (step S604).

When a gain exists in the average sound pressures at the microphones 11 and 12, which have been determined in step S604, (YES in step S605), the audio signal analysis unit 15 determines that an uttered voice is present (utterance is performed), and determines a ratio (sound pressure ratio) of the average sound pressure at the second microphone 12 to the average sound pressure at the first microphone 11 (step S606). If the sound pressure ratio determined in step S606 is larger than or equal to the threshold (YES in step S607), the audio signal analysis unit 15 determines that the uttered voice is a voice of the wearer (step S608). The audio signal analysis unit 15 then determines the utterance feature of the wearer, i.e., a speaker, on the basis of the audio signals of this utterance (target utterance) (step S609). If the sound pressure ratio determined in step S606 is smaller than the threshold (NO in step S607), the audio signal analysis unit 15 determines that the uttered voice is a voice of the other person (step S610). The audio signal analysis unit 15 then determines the utterance feature of the other person, i.e., a speaker, on the basis of the audio signals of this utterance (target utterance) (step S611).

On the other hand, when no gain exists in the average sound pressures at the microphones 11 and 12, which have been determined in step S604, (NO in step S605), the audio signal analysis unit 15 determines that an uttered voice is absent (utterance is not performed) (step S612). Meanwhile, it may be determined that the gain exists when the value of the gain of the average sound pressure is larger than or equal to a predetermined value in consideration of a case where noise that has not been removed by the filtering processing of step S603 may remain in the signals.

Subsequently, the audio signal analysis unit 15 transmits, as an analysis result, the information obtained in the processing of steps S604 to S612 (the presence or absence of the utterance, information on the speaker, the utterance feature of the speaker) to the host apparatus 20 via the data transmission unit 16 (step S613). At this time, duration of an utterance of each speaker (the wearer or the other person), the value of the gain of the average sound pressure, and other additional information may be transmitted to the host apparatus 20 together with the analysis result.

Meanwhile, in this exemplary embodiment, whether an uttered voice is a voice uttered by the wearer or by the other person is determined by comparing the sound pressure at the first microphone 11 with the sound pressure at the second microphone 12. However, discrimination of speakers according to this exemplary embodiment is not limited to the discrimination based on comparison of sound pressures as long as the discrimination is performed on the basis of nonverbal information that is extracted from the audio signals acquired by the microphones 11 and 12. For example, an audio acquisition time (output time of an audio signal) at the first microphone 11 may be compared with an audio acquisition time at the second microphone 12. In this case, a certain degree of difference (time difference) may be caused between the audio acquisition times regarding a voice uttered by the wearer since a difference between the distance between the mouth of the wearer and the first microphone 11 and the distance between the mouth of the wearer and the second microphone 12 is large. On the other hand, the time difference between the audio acquisition times regarding a voice uttered by the other person is smaller than that for the voice uttered by the wearer since a difference between the distance between the mouth of the other person and the first microphone 11 and the distance between the mouth of the other person and the second microphone 12 is small. Accordingly, a threshold may be set for the time difference between the audio acquisition times. If the time difference between the audio acquisition times is larger than or equal to the threshold, the voice may be determined to be uttered by the wearer. If the time difference between the audio acquisition times is smaller than the threshold, the voice may be determined to be uttered by the other person.

Application examples of the audio analysis system and functions of host apparatus 20 will be described. In the audio analysis system according to this exemplary embodiment, information (utterance information) on the utterance which has been acquired by the plural terminal apparatuses 10 in the above manner is gathered in the host apparatus 20. The host apparatus 20 performs various analysis processes using the information acquired from the plural terminal apparatuses 10, in accordance with the use purpose and application of the audio analysis system. An example will be described below in which this exemplary embodiment is used as a system for acquiring information regarding communication performed between plural wearers.

Figure 7:
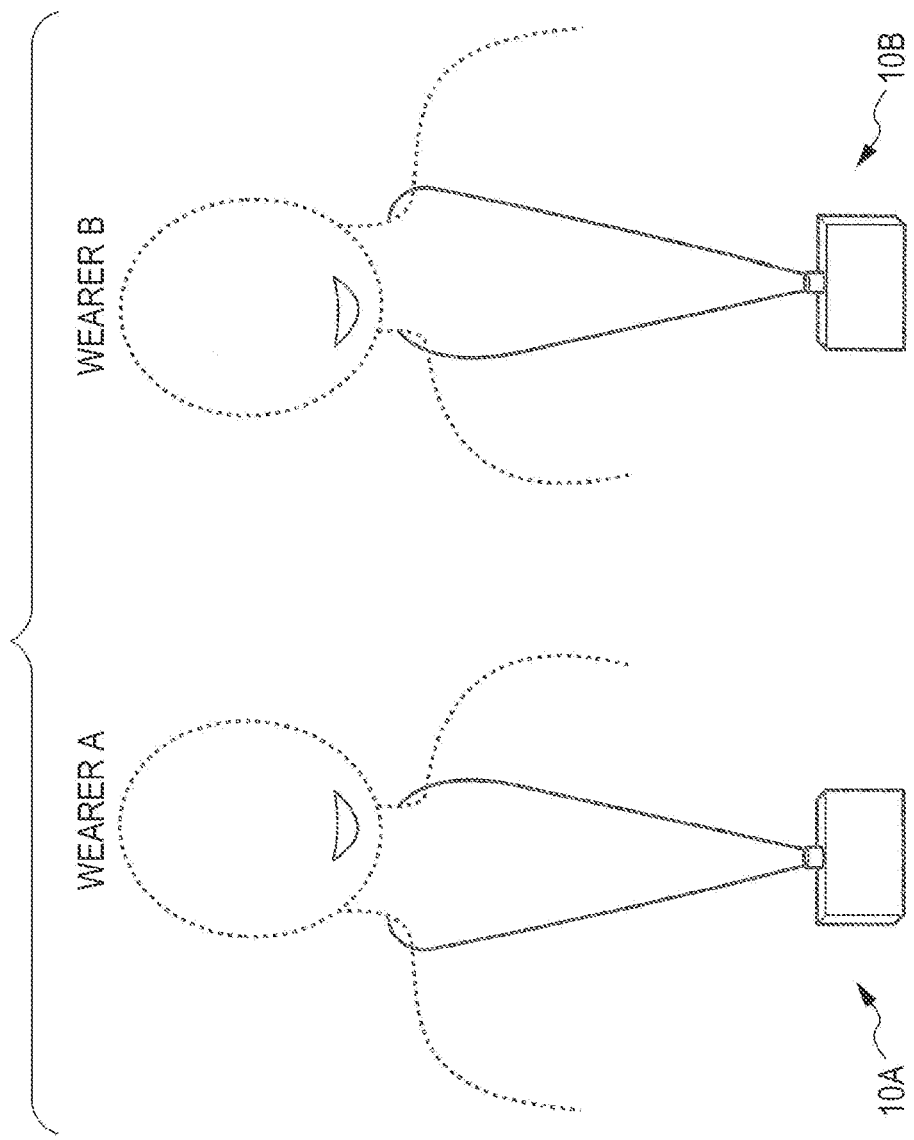
FIG. 7 is a diagram illustrating a state where plural wearers each wearing the terminal apparatus of the exemplary embodiment are having a conversation.
Figure 8:
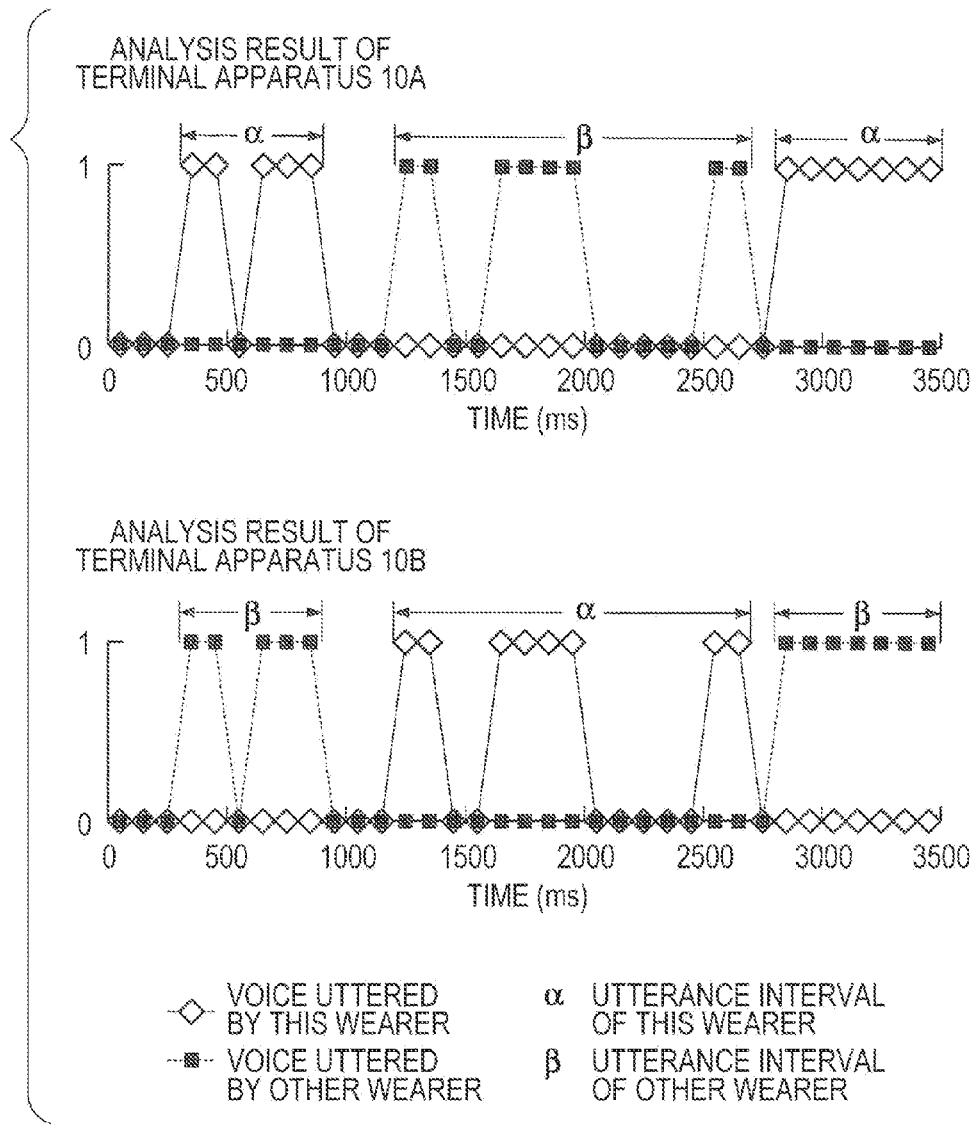
FIG. 8 is a diagram illustrating an example of utterance information of each terminal apparatus obtained in the state of the conversation illustrated in FIG. 7.

FIG. 7 is a diagram illustrating a state where plural wearers each wearing the terminal apparatus 10 according to this exemplary embodiment are having a conversation. FIG. 8 is a diagram illustrating an example of utterance information of each of terminal apparatuses 10A and 10B obtained in the state of the conversation illustrated in FIG. 7.

As illustrated in FIG. 7, a case will be discussed where two wearers A and B each wearing the terminal apparatus 10 are having a conversation. In this case, a voice recognized as an utterance of the wearer by the terminal apparatus 10A of the wearer A is recognized as an utterance of another person by the terminal apparatus 10B of the wearer B. In contrast, a voice recognized as an utterance of the wearer by the terminal apparatus 10B is recognized as an utterance of another person by the terminal apparatus 10A.

The terminal apparatuses 10A and 10B separately transmit utterance information to the host apparatus 20. In the utterance information acquired from the terminal apparatus 10A and the utterance information acquired from the terminal apparatus 10B, discrimination results of speakers (the wearer and the other person) are opposite but information indicating an utterance state, such as durations of utterances and timings at which the speaker is switched, resembles. Accordingly, the host apparatus 20 in this application example compares the information acquired from the terminal apparatus 10A with the information acquired from the terminal apparatus 10B, thereby determining that these pieces of information indicate the same utterance state and recognizing that the wearers A and B are having a conversation. Here, the information indicating the utterance state includes at least utterance-related time information, such as the duration of each utterance of each speaker, the start and end times of each utterance, the time (timing) at which the speaker is switched. Additionally, part of the utterance-related time information may be used or other information may be additionally used in order to determine an utterance state of a specific conversation.

Figure 9:
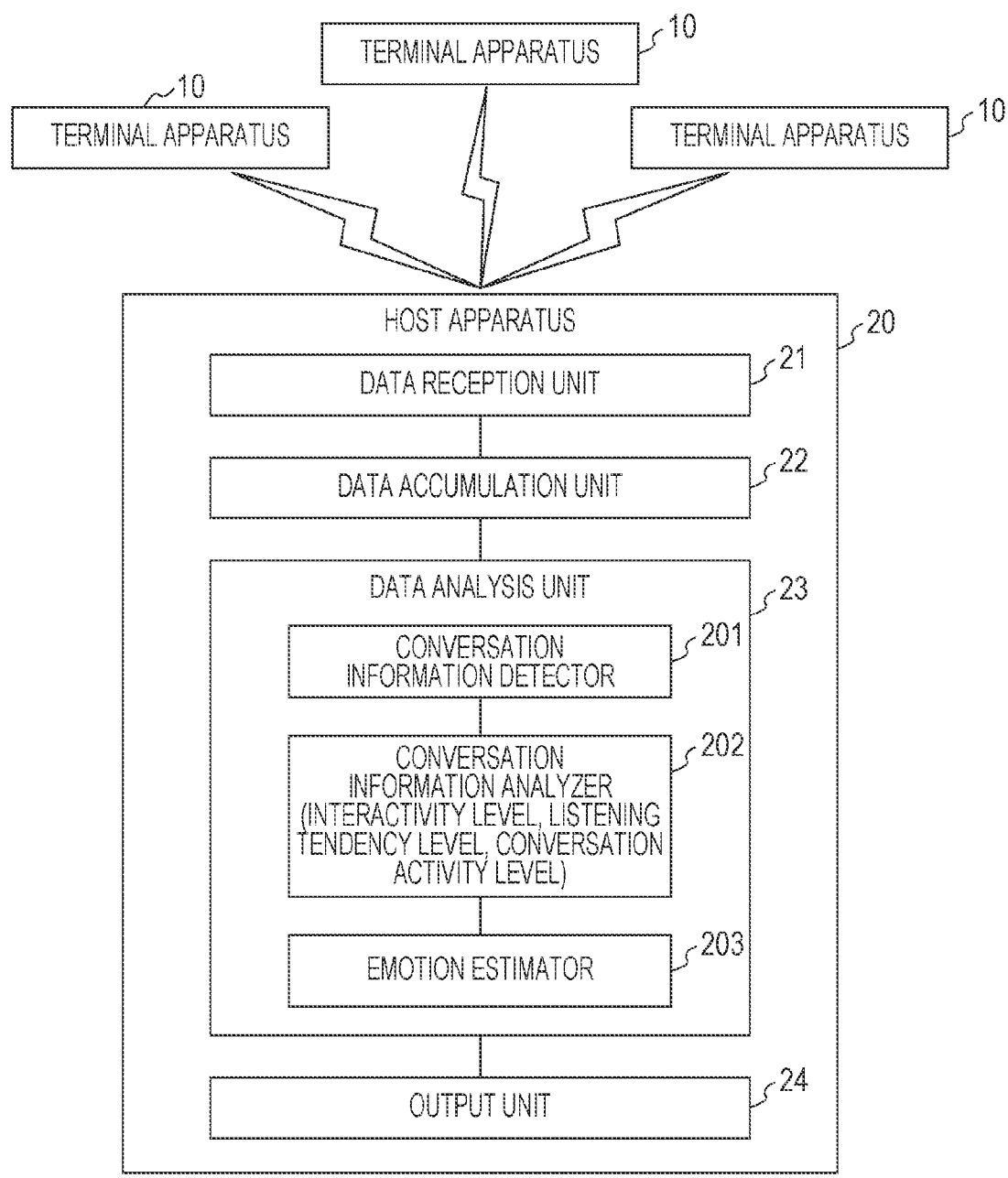
FIG. 9 is a diagram illustrating an example of a functional configuration of a host apparatus used in the exemplary embodiment.

FIG. 9 is a diagram illustrating an example of a functional configuration of the host apparatus 20 in this application example.

In this application example, the host apparatus 20 includes a conversation information detector 201 that detects utterance information (hereinafter, referred to as conversation information) acquired from the terminal apparatuses 10 of wearers who are having a conversation, from among pieces of utterance information acquired from the terminal apparatuses 10, a conversation information analyzer 202 that analyzes the detected conversation information, and an emotion estimator 203. The conversation information detector 201, the conversation information analyzer 202, and the emotion estimator 203 are implemented as functions of the data analysis unit 23. Meanwhile, these functions may be implemented in a single apparatus, or may be distributed by implementing the functions in multiple apparatuses via a network.

Utterance information is transmitted to the host apparatus 20 also from the terminal apparatuses 10 other than the terminal apparatuses 10A and 10B. The utterance information that has been received by the data reception unit 21 from each terminal apparatus 10 is accumulated in the data accumulation unit 22. The conversation information detector 201 of the data analysis unit 23 then reads out the utterance information of each terminal apparatus 10 accumulated in the data accumulation unit 22, and detects conversation information, which is utterance information regarding a specific conversation.

As illustrated in FIG. 8, a characteristic correspondence different from that of the utterance information of the other terminal apparatuses 10 is extracted from the utterance information of the terminal apparatus 10A and the utterance information of the terminal apparatus 10B. The conversation information detector 201 compares the utterance information that has been acquired from each terminal apparatus 10 and accumulated in the data accumulation unit 22, detects pieces of utterance information having the foregoing correspondence from among the pieces of utterance information acquired from the plural terminal apparatuses 10, and identifies the detected pieces of utterance information as conversation information regarding the same conversation. Since utterance information is transmitted to the host apparatus 20 from the plural terminal apparatuses 10 at any time, the conversation information detector 201 sequentially divides the utterance information into portions of a predetermined period and performs the aforementioned process, thereby determining whether or not conversation information regarding a specific conversation is included.

The condition used by the conversation information detector 201 to detect the conversation information regarding the specific conversation from among the pieces of utterance information of the plural terminal apparatuses 10 is not limited to the aforementioned correspondence illustrated in FIG. 8. The conversation information may be detected using any methods that allow the conversation information detector 201 to identify conversation information regarding a specific conversation from among pieces of utterance information.

Additionally, although the example is presented above in which two wearers each wearing the terminal apparatus 10 are having a conversation, the number of conversation participants is not limited to two. When three or more wearers are having a conversation, the terminal apparatus 10 worn by each wearer recognizes a voice uttered by the wearer of this terminal apparatus 10 as an uttered voice of the wearer, and discriminates the voice from voices uttered by the (two or more) other people. However, information indicating the utterance state, such as durations of utterances and timings at which the speaker is switched, resembles between the pieces of information acquired by the terminal apparatuses 10. Accordingly, as in the aforementioned case for a conversation between two people, the conversation information detector 201 detects utterance information acquired from the terminal apparatuses 10 of the wearers who are participating in the same conversation, and discriminates this information from the utterance information acquired from the terminal apparatuses 10 of the wearers who are not participating in the conversation.

Thereafter, the conversation information analyzer 202 analyzes the conversation information that has been detected by the conversation information detector 201, and extracts features of the conversation. Specifically, in this exemplary embodiment, features of the conversation are extracted using three evaluation criteria, i.e., an interactivity level, a listening tendency level, and a conversation activity level. Here, the interactivity level represents a balance regarding frequencies of utterances of the conversation participants. The listening tendency level represents a degree at which each conversation participant listens to utterances of the other people. The conversation activity level represents a density of utterances in the conversation.

The interactivity level is identified by the number of times the speaker is switched during the conversation and a variance in times spent until a speaker is switched to another speaker (time over which one speaker continuously performs an utterance). This level is obtained on the basis of the number of times the speaker is switched and the time of the switching, from conversation information for a predetermined time. The more the number of times the speaker is switched and the smaller the variance in durations of continuous utterances of the speakers, the greater the value of the interactivity level. This evaluation criterion is common in all conversation information regarding the same conversation (utterance information of each terminal apparatus 10).

The listening tendency level is identified by a ratio of utterance duration of each conversation participant to utterance durations of the other participants in the conversation information. For example, regarding the following equation, it is assumed that the greater the value, the greater the listening tendency level.

Listening tendency level=(Utterance duration of other people)=(Utterance duration of wearer)

This evaluation criterion differs for each utterance information acquired from the corresponding terminal apparatus 10 of each conversation participant even when the conversation information is regarding the same conversation.

The conversation activity level is an index representing liveliness of the conversation, and is identified by a ratio of a silent period (a time during which no conversation participant speaks) to the whole conversation information. The shorter the sum of silent periods, the more frequently any of the conversation participants speaks in the conversation, and the value of the conversation activity level is large. This evaluation criterion is common in all conversation information (utterance information of each terminal apparatus 10) regarding the same conversation.

The conversation information analyzer 202 analyzes the conversation information in the aforementioned manner, whereby features of the conversation are extracted for the conversation information. Additionally, the attitude of each participant toward the conversation is also identified from the aforementioned analysis. Meanwhile, the foregoing evaluation criteria are merely examples of information representing the features of the conversation, and evaluation criteria according to the use purpose and application of the audio analysis system according to this exemplary embodiment may be set by adopting other evaluation items or weighting each evaluation item.

By performing the foregoing analysis on various pieces of conversation information that have been detected by the conversation information detector 201 from among pieces of utterance information accumulated in the data accumulation unit 22, a communication tendency of a group of wearers of the terminal apparatuses 10 may be analyzed. Specifically, for example, by examining a correlation between the frequency of conversations and values, such as the number of conversation participants, duration of a conversation, the interactivity level, and the conversation activity level, the type of conversation that tends to be performed among the group of wearers is determined.

Additionally, by performing the foregoing analysis on pieces of conversation information of a specific wearer, a communication tendency of the wearer may be analyzed. An attitude of a specific wearer toward a conversation may have a certain tendency depending on conditions, such as partners of the conversation and the number of conversation participants. Accordingly, by examining pieces of conversation information of a specific wearer, it is expected that features, such as that the interactivity level is high in a conversation with a specific partner and that the listening tendency level increases if the number of conversation participants increases, are detected.

A description will be given next for estimation of an emotion of a conversation participant, which is implemented as one of analysis processes performed by the foregoing host apparatus 20.

The data analysis unit 23 of the host apparatus 20 extracts utterance information regarding a specific conversation (conversation information) from among pieces of utterance information acquired from the plural terminal apparatuses 10, using the aforementioned function for identifying a conversation. The emotion estimator 203 of the data analysis unit 23 then estimates an emotion of each speaker on the basis of information on the utterance feature of the speaker included in this conversation information.

Here, "delight", "anger", "sorrow", and "pleasure" are used as indices representing emotions in this exemplary embodiment. However, these indices are merely example indices that are usable in this exemplary embodiment, and some of these four indices may be used or indices representing other emotions (e.g., "pain", "fear", "joy", and "happiness") may be used in actual systems. The emotion estimation result obtained as the analysis result may be presented by specifying the index representing the emotion that the estimation result comes under, or by using estimated occurrence probabilities of the plural indices. In the former case, for example, an estimation result such as "the emotion of the speaker is "delight"" is obtained. In the latter case, for example, an estimation result such as "delight: 43%, anger: 30%, sorrow: 12%, pleasure: 15%" is obtained.

In this exemplary embodiment, the emotion estimator 203 estimates the emotion of each speaker that may occur from a role of a conversation participant (speaker) in a conversation situation, on the basis of the utterance feature of the speaker in the conversation situation. Accordingly, plural speakers are subjected to the estimation. In this exemplary embodiment, timings at which the speaker is switched are focused on. The emotion of each speaker during the conversation is estimated on the basis of the utterance feature of the speaker who has uttered before switching (hereinafter, referred as a preceding speaker) and the utterance feature of the speaker who has uttered after switching (hereinafter, referred to as a following speaker). Specifically, when there are two conversation participants, a correlation between the utterance features of the two participants having a conversation and their emotional states (subjected emotion indices) are grasped in advance. The emotion of each conversation participant is estimated (estimated value is determined) from the observed utterance feature (detected value) of the conversation participant.

Here, methods for determining an estimated emotion value from an observed value are roughly categorized into a method for creating a correlation formula, and a method for creating a lookup table.

The correlation formula used in the former method is ideally determined on the basis of some kind of physical principle. However, it is actually difficult to create the formula for emotions. Accordingly, it is practically reasonable to create and use an approximation formula on the basis of discrete experimental points determined by statistical observations as in the case of the lookup table to be described later.

The lookup table used in the latter method is created by observing many actual conversation situations and statistically processing calculated values (observed values) of the utterance features and emotions at that time, for example. Here, information on the emotion at the time of observation is acquired by a questionnaire to the person or judgment made by a third person through observation.

Figure 10:
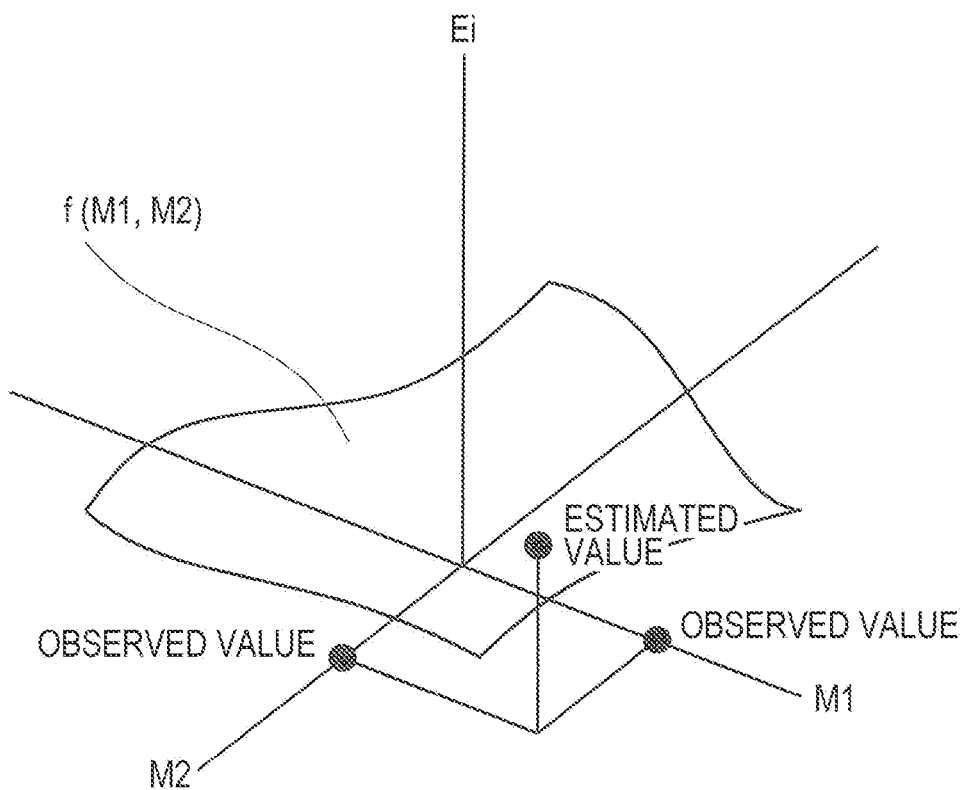
FIG. 10 is a diagram illustrating a method for creating a correlation formula, among methods for estimating an emotion of a speaker according to the exemplary embodiment.

FIG. 10 is a diagram describing a method for creating a correlation formula among the methods for estimating an emotion of a speaker.

In FIG. 10, the correlation formula is denoted by a correlation plane f(M1, M2). Here, M1 represents the utterance feature of the preceding speaker, whereas M2 represents the utterance feature of the following speaker. In this case, by introducing the observed values of the utterance features of the preceding and following speakers to the correlation formula, an estimated emotion value of each speaker is determined. Although FIG. 10 illustrates one example of the correlation plane of the preceding speaker among correlation planes that represent the correlation formula, correlation planes of the preceding and following speakers are actually present for each of the aforementioned indices representing the emotions.

Specifically, the following equations are obtained.

$$Ei,1 = f1(M1,M2)$$

$$Ei,2 = f2(M1,M2)$$

Here, "Ei, 1" denotes an emotion index of the preceding speaker, whereas "Ei, 2" denotes an emotion index of the following speaker. When the aforementioned emotions "delight", "anger", "sorrow", and "pleasure" are used as indices representing the emotions, "i" is equal to 1 to 4, and E1, E2, E3, and E4 denote estimated probabilities of "delight", "anger", "sorrow", and "pleasant", respectively.

FIG. 11 is a diagram illustrating an example of the lookup table used in the method for creating a lookup table, among the methods for estimating an emotion of a speaker.

In FIG. 11, "Ei, 1" and "Ei, 2" (i=1 to 4) have the same meanings as those used in the aforementioned method for creating the correlation formula. In the table illustrated in FIG. 11, values are written for a range where the utterance features of the preceding and following speakers are "equal to −0.4 or smaller", and values for other ranges are omitted. When this lookup table is used, estimated emotion values are determined by comparing the utterance features of two speakers with the lookup table. When the estimated emotion values are determined, a corresponding range in the table may be specified or interpolation or extrapolation may be performed using values registered in the table to determine the estimated emotion values.

As described above, in this exemplary embodiment, a timing at which the speaker is switched in a conversation is focused on, and emotions of the preceding and following speakers are estimated on the basis of the utterance features of the speakers of the preceding and following utterances. Accordingly, estimation of emotions is performed so that the previous, current, and next estimated emotion values overlap (in a manner of so-called pipeline processing). Accordingly, in order to ensure the continuity of emotion, an estimated value is multiplied by a specific weight α, and an average of the resulting value and the preceding and following estimated values is determined as a final estimation result in this exemplary embodiment.

FIG. 12 is a diagram illustrating a process in which an emotion of a speaker is estimated every time the speaker is switched so as to obtain a final estimation result in the exemplary embodiment.

In the example illustrated in FIG. 12, two speakers (A and B) alternately perform utterances, and an emotion of each speaker is estimated at times at which the speaker is switched (switching timings of the speaker n−1, n, n+1). The final estimation results for the speakers A and B at the speaker switching timing n are obtained by multiplying the estimation results for the corresponding timings by weights (α, n−1), (α, n), (α, n+1), respectively, summing the resulting values, and averaging out the resulting sum.

Next, a concrete example of an emotion estimation process will be described.

In this concrete example, an average sound pressure is used as the audio feature value, and emotions are estimated by using the method for creating a lookup table. The estimation results are represented by probabilities (estimated probabilities) that the estimation results come under the indices of emotions. Additionally, a conversation between two conversation participants is subjected to analysis in this concrete example.

First, statistical processing for creating a lookup table will be described.

Samples for the statistical processing are acquired by focusing on situations where absolute values of the utterance features, which are considered to reflect mental states of speakers and are named as "mental states" here, of the conversation participants are greater than or equal to 0.3 (high mental state: 0.3 or greater, or low mental state: −0.3 or smaller). Specifically, situations are focused on in which the mental states of the two conversation participants indicate states that greatly differ from the usual states (such as when the conversation participants are excited or relaxed). The following four patterns are possible as combinations of the mental states in such situations.

Pattern 1: the mental states of the preceding and following speakers are high.

Pattern 2: the mental state of the preceding speaker is high, whereas the mental state of the following speaker is low.

Pattern 3: the mental state of the preceding speaker is low, whereas the mental state of the following speaker is high.

Pattern 4: the mental states of the preceding and following speakers are low.

Many situations that come under the foregoing patterns (for example, thirty situations for each pattern) are extracted from actual conversations, evaluated based on observations made by a third person (non-conversation participant), whereby combinations of emotions (delight, anger, sorrow, and pleasure) of the individual conversation participants are estimated. Occurrence probabilities of delight, anger, sorrow, and pleasure of each conversation participant (how many situations among the thirty situations come under the corresponding emotions) are calculated for each of the four patterns.

FIGS. 13A to 13D are diagrams illustrating examples of occurrence probabilities of emotions of conversation participants (speakers) in each pattern of the mental states.

For example, it is understood by referring to FIG. 13A which corresponds to the pattern 1 that a probability that both the preceding and following speakers are delighted, a probability that the preceding speaker is delighted but the following speaker is angry, a probability that the preceding speaker is delighted but the following speaker is feeling sorrow, and a probability that the preceding speaker is delighted and the following speaker is feeling pleasant are 40.0%, 3.3%, 0%, and 6.7%, respectively, in the conversation situations that come under the pattern 1.

Subsequently, a lookup table is created on the basis of the occurrence probabilities obtained in the above manner.

FIG. 14 is a diagram illustrating an example of the lookup table.

In the lookup table illustrated in FIG. 14, values in a region where the absolute value of the utterance feature of at least one of the conversation participants is smaller than or equal to 0.3 (a blank cross-shaped region in the illustrated table) are determined by performing interpolation. For example, when the utterance features of both conversation participants are equal to zero (which corresponds to the usual mental state), it is assumed that probabilities of emotions of delight, anger, sorrow, and pleasure are even, i.e., 25%. An interpolation value of the probabilities of this zero point and the probabilities in the region where the absolute value of the mental state is greater than or equal to 0.3 are calculated.

The lookup table created in the above manner is stored in a nonvolatile storage device (such as a read only memory (ROM) or a magnetic disk device) of the host apparatus 20 illustrated in FIGS. 1 and 9. A central processing unit (CPU) that is controlled based on a program to function as the emotion estimator 203 estimates emotions of the conversation participants with reference to this lookup table, and outputs the estimation results via the output unit 24.

Next, an example will be described in which emotions of conversation participants are estimated, by using concrete conversation situations.

Figure 15A:
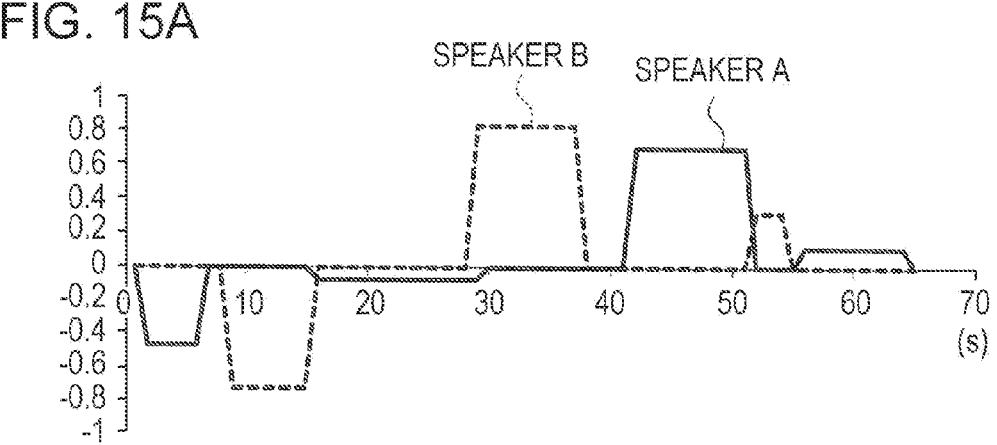
FIGS. 15A to 15C are diagrams illustrating an example of estimation of emotions of conversation participants in a first exemplary situation according to the exemplary embodiment.
Figure 15B:
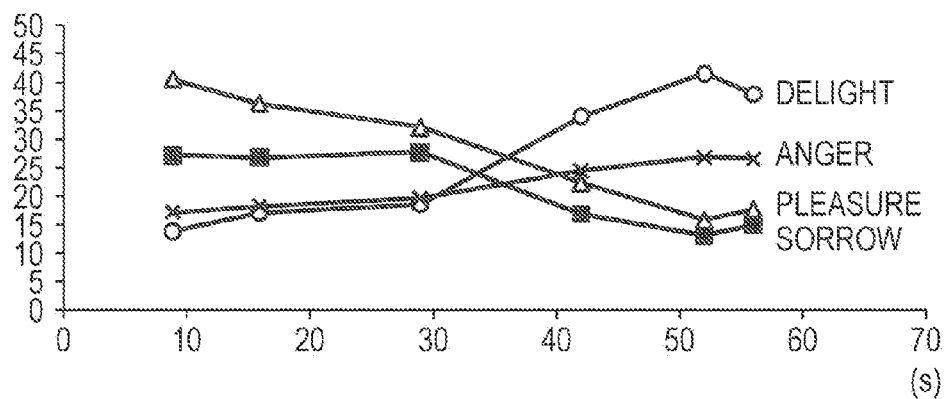
Figure 15C:
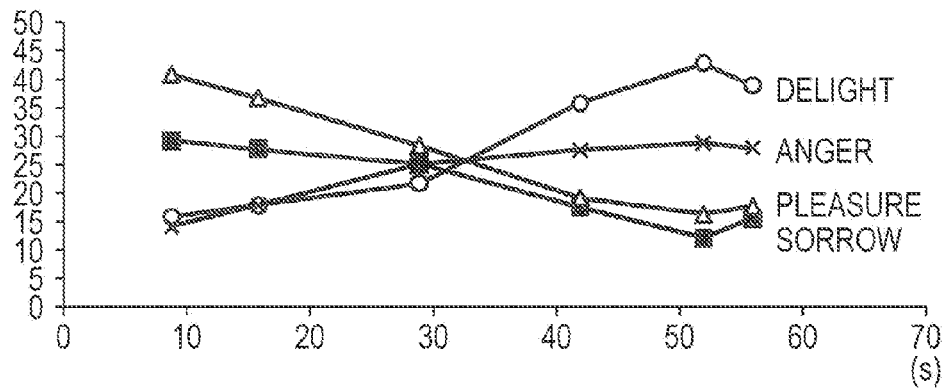

FIGS. 15A to 15C are diagrams illustrating an example of estimation performed in a first exemplary situation. Specifically, FIG. 15A illustrates the mental states of conversation participants. FIG. 15B illustrates estimated values (probabilities) of emotions of a speaker A, whereas FIG. 15C illustrates estimated values (probabilities) of emotions of a speaker B.

As the first exemplary situation, a situation is assumed where the relaxed speakers A and B are having a lively conversation. In FIG. 15A, a change in the mental state of the speaker A and a change in the mental state of the speaker B are denoted by a solid line and a broken line, respectively. The emotion estimator 203 of the host apparatus 20 compares the information on the mental states illustrated in FIG. 15A with the lookup table illustrated in FIG. 14, thereby obtaining estimation values illustrated in FIGS. 15B and 15C. It is understood by referring to FIGS. 15B and 15C that the situation is shifting to a state where probabilities that emotions of the speakers A and B are "delight" are increasing as the conversation progresses.

Figure 16A:
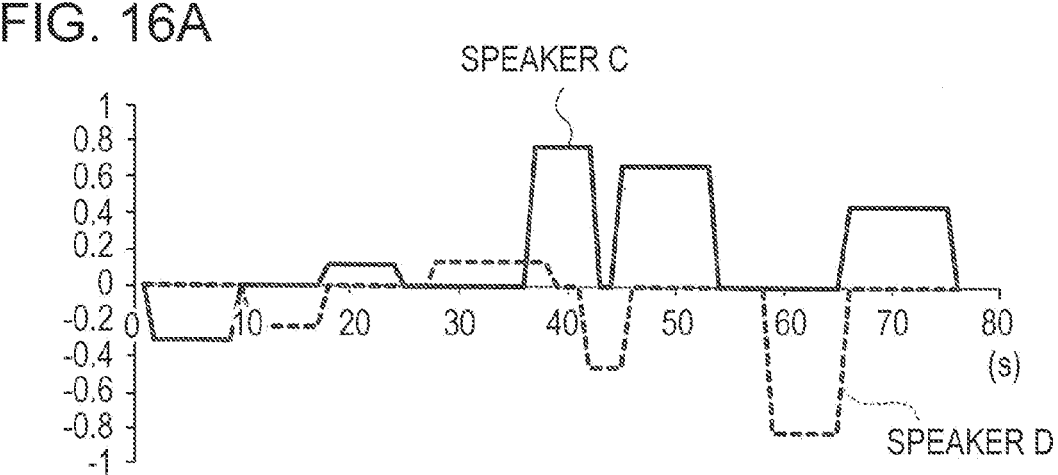
FIGS. 16A to 16C are diagrams illustrating an example of estimation of emotions of conversation participants in a second exemplary situation according to the exemplary embodiment.
Figure 16B:
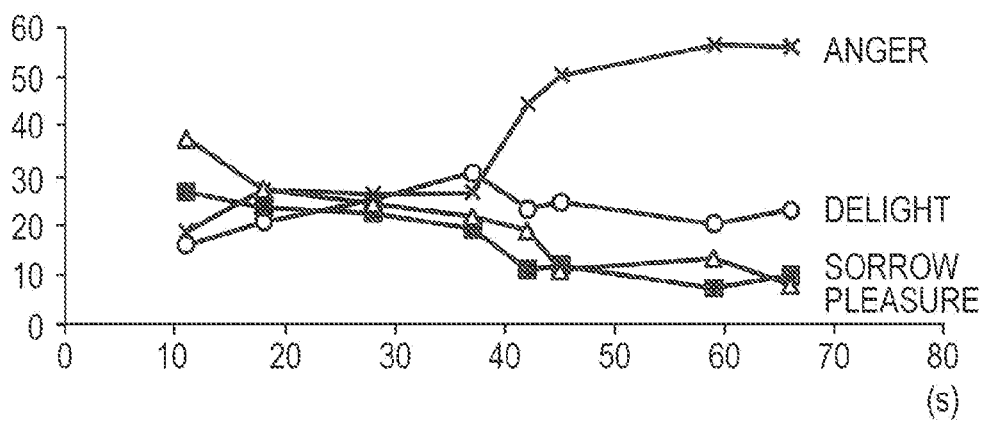
Figure 16C:
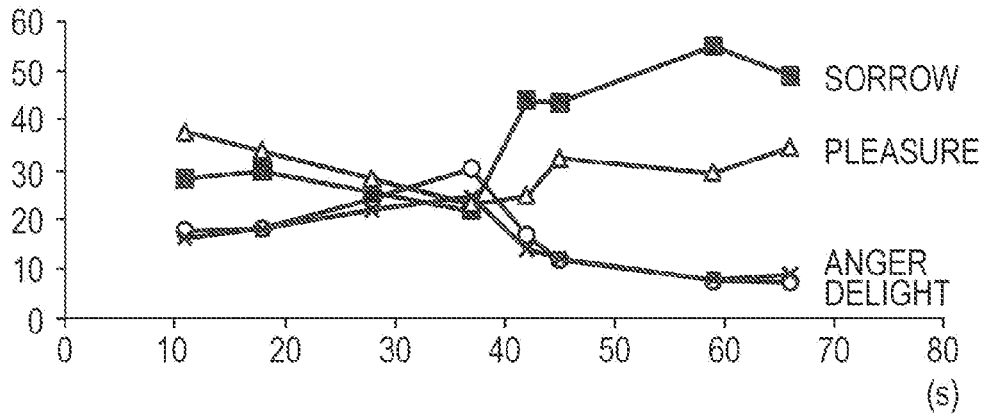

FIGS. 16A to 16C are diagrams illustrating an example of estimation performed in a second exemplary situation. Specifically, FIG. 16A illustrates the mental states of conversation participants. FIG. 16B illustrates estimated values (probabilities) of emotions of a speaker C, whereas FIG. 16C illustrates estimated values (probabilities) of emotions of a speaker D.

As the second exemplary situation, a situation is assumed where the speaker D is admonished by the speaker C. In FIG. 16A, a change in the mental state of the speaker C and a change in the mental state of the speaker D are denoted by a solid line and a broken line, respectively. The emotion estimator 203 of the host apparatus 20 compares the information on the mental states illustrated in FIG. 16A with the lookup table illustrated in FIG. 14, thereby obtaining estimation values illustrated in FIGS. 16B and 16C. It is understood by referring to FIG. 16B that the situation is shifting to a state where a probability that the emotion of the speaker C is "anger" is increasing as the conversation progresses. It is also understood by referring to FIG. 16C that the situation is shifting to a state where a probability that the emotion of the speaker D is "sorrow" is increasing as the conversation progresses.

Although the examples of estimation of emotions of speakers according to this exemplary embodiment have been described above for concrete conversation situations, application targets of the estimation of emotions according this exemplary embodiment are not limited to the foregoing situations. For example, although the description has been given in the above examples for a case where two conversation participants are present, emotions of individual conversation participants may be estimated even when three or more conversation participants are present. Since the conversation information detector 201 of the data analysis unit 23 detects pieces of utterance information regarding the same conversation in this exemplary embodiment, a speaker who has performed each utterance may be identified and information on the utterance feature of each speaker may be separately extracted regarding a conversation made by three or more conversation participants. Accordingly, emotions of the individual speakers may be estimated on the basis of the obtained information on the utterance features. Additionally, as a method for discriminating between a voice of a wearer of the terminal apparatus 10 and a voice of another person who is not the wearer, a known speaker recognition technology may be used which is based on biometric voice features unique to a wearer. A reference voiceprint of a wearer of the terminal apparatus 10 is prepared by analyzing their voice before or after a conversation, and voice portions of the wearer and voice portions of other people in an audio signal are discriminated on the basis of the voice features.

Additionally, in this exemplary embodiment, the audio signal analysis unit 15 of the terminal apparatus 10 identifies whether or not a speaker is the wearer of the terminal apparatus 10. That is, the audio signal analysis unit 15 does not identify the other people. Accordingly, a specific person having the utterance feature of the other speaker determined in step S611 is unidentifiable. However, in the case of a conversation made by two conversation participants, the other person who is a conversation partner of the wearer is uniquely identified although the other person is unknown. Since roles of the wearer and the other person in the conversation are identified, emotions of the wearer and the other person may be estimated from utterance information acquired by the terminal apparatus 10 of the wearer. Additionally, when all conversation participants are wearing the terminal apparatuses 10, the emotion of each conversation participant may be estimated using the utterance feature of the wearer transmitted from the corresponding terminal apparatus 10. In this case, estimation of the utterance feature of the other person performed in step S611 may be omitted.

Meanwhile, estimation of an emotion of a speaker according to this exemplary embodiment is desirably performed using the utterance feature, which is estimated on the basis of an audio feature value that is nonverbal information and is acquired as utterance information in the terminal apparatus 10, and concrete content of the process is not limited to the aforementioned one. Furthermore, processing functions for executing various analysis and examination processes on the utterance information acquired by the terminal apparatus 10 according to this exemplary embodiment may be implemented as functions of the host apparatus 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An audio analysis system comprising:
  a terminal apparatus that is to be worn by a user; and
  a host system that acquires information from the terminal apparatus,
  wherein the terminal apparatus includes
    a first audio acquisition device that acquires a sound and converts the sound into a first audio signal, the sound containing an utterance of the user and an utterance of another person who is different from the user,
    a discriminator that discriminates between a portion that corresponds to the utterance of the user and a portion that corresponds to the utterance of the other person which are contained in the first audio signal,
    an utterance feature detector that detects an utterance feature of the user or the other person, on the basis of the portion that corresponds to the utterance of the user or the portion that corresponds to the utterance of the other person, and
    a transmission unit that transmits to the host system utterance information that contains at least a discrimination result obtained by the discriminator and a detection result obtained by the utterance feature detector, and
  wherein the host system includes
    a reception unit that receives the utterance information that has been transmitted from the transmission unit,
    a conversation information detector that detects a part corresponding to a first conversation between the user and the other person from the utterance information that has been received by the reception unit, and detects portions of the part of the utterance information that correspond to the user and the other person who are related to the first conversation,
    a relation information holding unit that holds relation information on a relation between a predetermined emotion name and a combination of a plurality of the utterance features of a plurality of speakers who participated in a past conversation,
    an emotion estimator that compares, with the relation information, a combination of a plurality of the utterance features that correspond to the portions of the part of the utterance information of the user and the other person who are related to the first conversation, and estimates an emotion of at least one of the user and the other person, and
    an output unit that outputs information that is based on an estimation result obtained by the emotion estimator.

2. The audio analysis system according to claim 1,
  wherein the terminal apparatus further includes
    a second audio acquisition device disposed at a position where a sound pressure of an utterance-based sound that arrives from the mouth of the user differs from a sound pressure of the utterance-based sound that arrives at the first audio acquisition device, the second audio acquisition device acquiring the sound and converting the sound into a second audio signal,
  wherein the discriminator discriminates between a portion that corresponds to the utterance of the user and a portion that corresponds to the utterance of the other person which are contained in the first audio signal, on the basis of a result of comparing the first audio signal with the second audio signal, and
  wherein the utterance feature detector detects an utterance feature of the user or the other person, on the basis of the portion that corresponds to the utterance of the user or the portion that corresponds to the utterance of the other person which is contained in the first audio signal or the second audio signal.

3. The audio analysis system according to claim 2, wherein the shortest distance between the mouth of the user and the first audio acquisition device differs from the shortest distance between the mouth of the user and the second audio acquisition device in a state where the terminal apparatus is worn by the user.

4. The audio analysis system according to claim 2, wherein the terminal apparatus includes
a main body, and
a strap that is to be connected to the main body and hung around the neck of the user, and
wherein in a state where the strap is hung around the neck of the user,
the first audio acquisition device is located in the main body or at part of the strap that is separate from the mouth of the user by approximately 30 to 40 centimeters, and
the second audio acquisition device is located at part of the strap that is separate from the mouth of the user by approximately 10 to 20 centimeters.

5. The audio analysis system according to claim 2, wherein the utterance feature detector of the terminal apparatus detects the utterance feature on the basis of a feature value of the sound that has been acquired by at least one of the first audio acquisition device and the second audio acquisition device, the feature value being sound pressure or pitch.

6. The audio analysis system according to claim 2, wherein the utterance feature detector of the terminal apparatus detects the utterance feature on the basis of a difference between a feature value of the audio signal of the sound that has been acquired by at least one of the first audio acquisition device and the second audio acquisition device and an average of predetermined feature values of a plurality of audio signals of sounds that were acquired by at least one of the first audio acquisition device and the second audio acquisition device during a predetermined past period.

7. The audio analysis system according to claim 1, wherein the emotion estimator of the host system determines a probability that corresponds to an index representing an emotion of the user or the other person who is related to the first conversation, and estimates the index representing the emotion on the basis of the probability.

8. The audio analysis system according to claim 7, wherein the output unit of the host system outputs information that is based on the probability of the index representing the emotion that has been estimated by the emotion estimator.

9. The audio analysis system according to claim 1, wherein the utterance feature detector of the terminal apparatus detects the utterance feature on the basis of a feature value of the sound that has been acquired by the first audio acquisition device, the feature value being sound pressure or pitch.

10. The audio analysis system according to claim 1, wherein the utterance feature detector of the terminal apparatus detects the utterance feature on the basis of a difference between a feature value of the audio signal of the sound that has been acquired by the first audio acquisition device and an average of predetermined feature values of a plurality of audio signals of sounds that were acquired by the first audio acquisition device during a predetermined past period.

11. An audio analysis system comprising:
a first terminal apparatus that is to be worn by a first user;
a second terminal apparatus that is to be worn by a second user; and
a host system that acquires information from the first terminal apparatus and the second terminal apparatus,
wherein the first terminal apparatus includes
a first audio acquisition device that acquires a sound and converts the sound into a first audio signal, the sound containing an utterance of the first user and an utterance of another person who is different from the first user,
a first discriminator that discriminates between a portion that corresponds to the utterance of the first user and a portion that corresponds to the utterance of the other person which are contained in the first audio signal,
a first utterance feature detector that detects a first utterance feature of the first user, on the basis of the portion that corresponds to the utterance of the first user or the portion that corresponds to the utterance of the other person which is contained in the first audio signal, and
a first transmission unit that transmits to the host system first utterance information that contains at least a discrimination result obtained by the first discriminator and a detection result regarding the first utterance feature obtained by the first utterance feature detector,
wherein the second terminal apparatus includes
a second audio acquisition device that acquires a sound and converts the sound into a second audio signal,
a second discriminator that discriminates between a portion that corresponds to an utterance of the second user and a portion that corresponds to an utterance of another person who is different from the second user, the portions being contained in the second audio signal,
a second utterance feature detector that detects a second utterance feature of the second user, on the basis of the portion that corresponds to the utterance of the second user or the portion that corresponds to the utterance of the other person which is contained in the second audio signal, and
a second transmission unit that transmits to the host system second utterance information that contains at least a discrimination result obtained by the second discriminator and a detection result regarding the second utterance feature obtained by the second utterance feature detector, and
wherein the host system includes
a reception unit that receives the first utterance information and the second utterance information that have been transmitted from the first and second transmission units, respectively,
a conversation information detector that detects a first part corresponding to a first conversation between the first user and the other person who is different from the first user from the first utterance information that has been received by the reception unit, and detects portions of the first part of the first utterance information that correspond to the first user and the other person who are related to the first conversation, and that detects a second part corresponding to a second conversation between the second user and the other person who is different from the second user from the second utterance information that has been received by the reception unit, and detects portions of the second part of the second utterance information that correspond to the second user and the other person who are related to the second conversation,
wherein the conversation information detector determines whether or not the first conversation and the second conversation are the same conversation between the first user and the second user on the basis of a comparison of the portions of the first part of the first utterance information that correspond to the first user and the other person who is different from the first user with the portions of the second part of the second utterance information that correspond to the second user and the other person who is different from the second user,
a relation information holding unit that holds relation information on a relation between a predetermined emotion name and a combination of a plurality of utterance features of a plurality of speakers who participated in a past conversation, an emotion estimator that compares, with the relation information, a combination of the first and second utterance features related to the conversation between the first user and the second user, and estimates an emotion of at least one of the first user and the second user, and an output unit that outputs information that is based on an estimation result obtained by the emotion estimator.

12. The audio analysis system according to claim 11, wherein the first terminal apparatus further includes a third audio acquisition device disposed at a position where a sound pressure of an utterance-based sound that arrives from the mouth of a user differs from a sound pressure of the utterance-based sound that arrives at the first audio acquisition device, the third audio acquisition device acquiring the sound and converting the sound into a third audio signal, wherein the first discriminator discriminates between a portion that corresponds to an utterance of the user and a portion that corresponds to an utterance of another person who is different from the user, the portions being contained in the first audio signal, on the basis of a result of comparing the first audio signal with the third audio signal, and wherein the first utterance feature detector detects an utterance feature of the user or the other person, on the basis of the portion that corresponds to the utterance of the user or the portion that corresponds to the utterance of the other person which is contained in the first audio signal or the third audio signal.

13. The audio analysis system according to claim 12, wherein the shortest distance between the mouth of the user and the first audio acquisition device differs from the shortest distance between the mouth of the user and the third audio acquisition device in a state where the first terminal apparatus is worn by the user.

14. The audio analysis system according to claim 12, wherein the first terminal apparatus includes a main body, and a strap that is to be connected to the main body and hung around the neck of the user, and wherein in a state where the strap is hung around the neck of the user, one of the first and third audio acquisition devices is located in the main body or at part of the strap that is separate from the mouth of the user by approximately 30 to 40 centimeters, and the other of the first and third audio acquisition devices is located at part of the strap that is separate from the mouth of the user by approximately 10 to 20 centimeters.

15. An audio analysis terminal comprising:

a first audio acquisition device that acquires, using a terminal apparatus, a sound and converts the sound into a first audio signal, the sound containing an utterance of a user and an utterance of another person who is different from the user;

a discriminator that discriminates between a portion that corresponds to the utterance of the user and a portion that corresponds to the utterance of the other person which are contained in the first audio signal;

an utterance feature detector that detects an utterance feature of the user or the other person, on the basis of the portion that corresponds to the utterance of the user or the portion that corresponds to the utterance of the other person;

a transmission unit that transmits to a host system utterance information that contains at least a discrimination result obtained by the discriminator and a detection result obtained by the utterance feature detector; and a second audio acquisition device disposed at a position where a sound pressure of an utterance-based sound that arrives from the mouth of the user differs from a sound pressure of the utterance-based sound that arrives at the first audio acquisition device, the second audio acquisition device acquiring the sound and converting the sound into a second audio signal, wherein the discriminator discriminates between a portion that corresponds to the utterance of the user and a portion that corresponds to the utterance of the other person which are contained in the first audio signal, on the basis of a result of comparing the first audio signal with the second audio signal, and wherein the utterance feature detector detects an utterance feature of the user or the other person, on the basis of the portion that corresponds to the utterance of the user or the portion that corresponds to the utterance of the other person which is contained in the first audio signal or the second audio signal, wherein the shortest distance between the mouth of the user and the first audio acquisition device differs from the shortest distance between the mouth of the user and the second audio acquisition device in a state where the audio analysis terminal is worn by the user.

16. The audio analysis terminal according to claim 15, further comprising:

a main body; and a strap that is to be connected to the main body and hung around the neck of the user, and wherein in a state where the strap is hung around the neck of the user, the first audio acquisition device is located in the main body or at part of the strap that is separate from the mouth of the user by approximately 30 to 40 centimeters, and the second audio acquisition device is located at part of the strap that is separate from the mouth of the user by approximately 10 to 20 centimeters.

17. The audio analysis terminal according to claim 15, wherein the utterance feature detector detects the utterance feature on the basis of a predetermined feature value of the sound that has been acquired by at least one of the first audio acquisition device and the second audio acquisition device, the feature value being sound pressure or pitch.

18. The audio analysis terminal according to claim 15, wherein the utterance feature detector detects the utterance feature on the basis of a difference between a feature value of the audio signal of the sound that has been acquired by at least one of the first audio acquisition device and the second audio acquisition device and an average of predetermined feature values of a plurality of audio signals of sounds that were acquired by at least one of the first audio acquisition device and the second audio acquisition device during a predetermined past period.

19. An audio analysis terminal comprising:

a first audio acquisition device that acquires, using a terminal apparatus, a sound and converts the sound into a first audio signal, the sound containing an utterance of a user and an utterance of another person who is different from the user;

a discriminator that discriminates between a portion that corresponds to the utterance of the user and a portion that corresponds to the utterance of the other person which are contained in the first audio signal;

an utterance feature detector that detects an utterance feature of the user or the other person, on the basis of the portion that corresponds to the utterance of the user or the portion that corresponds to the utterance of the other person; and a transmission unit that transmits to a host system utterance information that contains at least a discrimination result obtained by the discriminator and a detection result obtained by the utterance feature detector, wherein the utterance feature detector detects the utterance feature on the basis of a difference between a feature value of the audio signal of the sound that has been acquired by the first audio acquisition device and an average of predetermined feature values of a plurality of audio signals of sounds that were acquired by the first audio acquisition device during a predetermined past period.

* * * * *